(12) United States Patent
Goldstein et al.

(10) Patent No.: US 10,212,057 B2
(45) Date of Patent: Feb. 19, 2019

(54) DISPARATE MONITORING FOR IOT

(71) Applicant: salesforce.com, inc., San Francisco, CA (US)

(72) Inventors: Ian Michael Goldstein, San Francisco, CA (US); Charles Alexander Mott Meynet, San Francisco, CA (US); Jonathan Robert Graff, Seattle, WA (US); Vijay Swamidass, Castro Valley, CA (US)

(73) Assignee: salesforce.com inc., San Francisco, CA (US)

( * ) Notice: Subject to any disclaimer, the term of this patent is extended or adjusted under 35 U.S.C. 154(b) by 368 days.

(21) Appl. No.: 15/051,567

(22) Filed: Feb. 23, 2016

(65) Prior Publication Data

US 2017/0242560 A1    Aug. 24, 2017

(51) Int. Cl.
| | | |
|---|---|---|
| *G06F 3/0484* | (2013.01) | |
| *H04L 12/26* | (2006.01) | |
| *G06F 3/14* | (2006.01) | |
| *G06T 11/20* | (2006.01) | |

(52) U.S. Cl.
CPC .......... *H04L 43/045* (2013.01); *G06F 3/1454* (2013.01); *G06T 11/206* (2013.01); *H04L 43/065* (2013.01); *H04L 43/0817* (2013.01)

(58) Field of Classification Search
CPC ..... G06F 3/0484; G06F 3/0482; G06F 3/1454
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Andrea C Leggett
(74) *Attorney, Agent, or Firm* — Sterne, Kessler, Goldstein & Fox P.L.L.C.

(57) ABSTRACT

The disclosed technology offers methods of updating a data cube of samples and a display on a client device with a processor. The method provides GUI clients to computer devices; receives initial reports of sample values organized by sampled computing device and sampled aspect of operations, and identified by group membership and super-group membership; receives, from the devices, samples that update reports of sampled aspects of operations; and pushes updated reports to the GUI clients. The GUI clients calculate and update group and super-group aggregate operational status; and display a hierarchical representation of the aggregate operational status of the super-groups and groups and of the operational status of the computing devices, based on the sample values, in real or near real time, as received samples reach the clients. The operator viewing the display of the hierarchical representation is notified of operational aspects that require close monitoring or immediate remedial attention.

25 Claims, 15 Drawing Sheets

Example Hierarchical Ecosystem of Objects

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Lelenko et al. |
| 2013/0247216 A1 | 9/2013 | Cinarkaya et al. |
| 2016/0048511 A1* | 2/2016 | Bhagwat ........... G06F 17/30719 707/755 |

\* cited by examiner

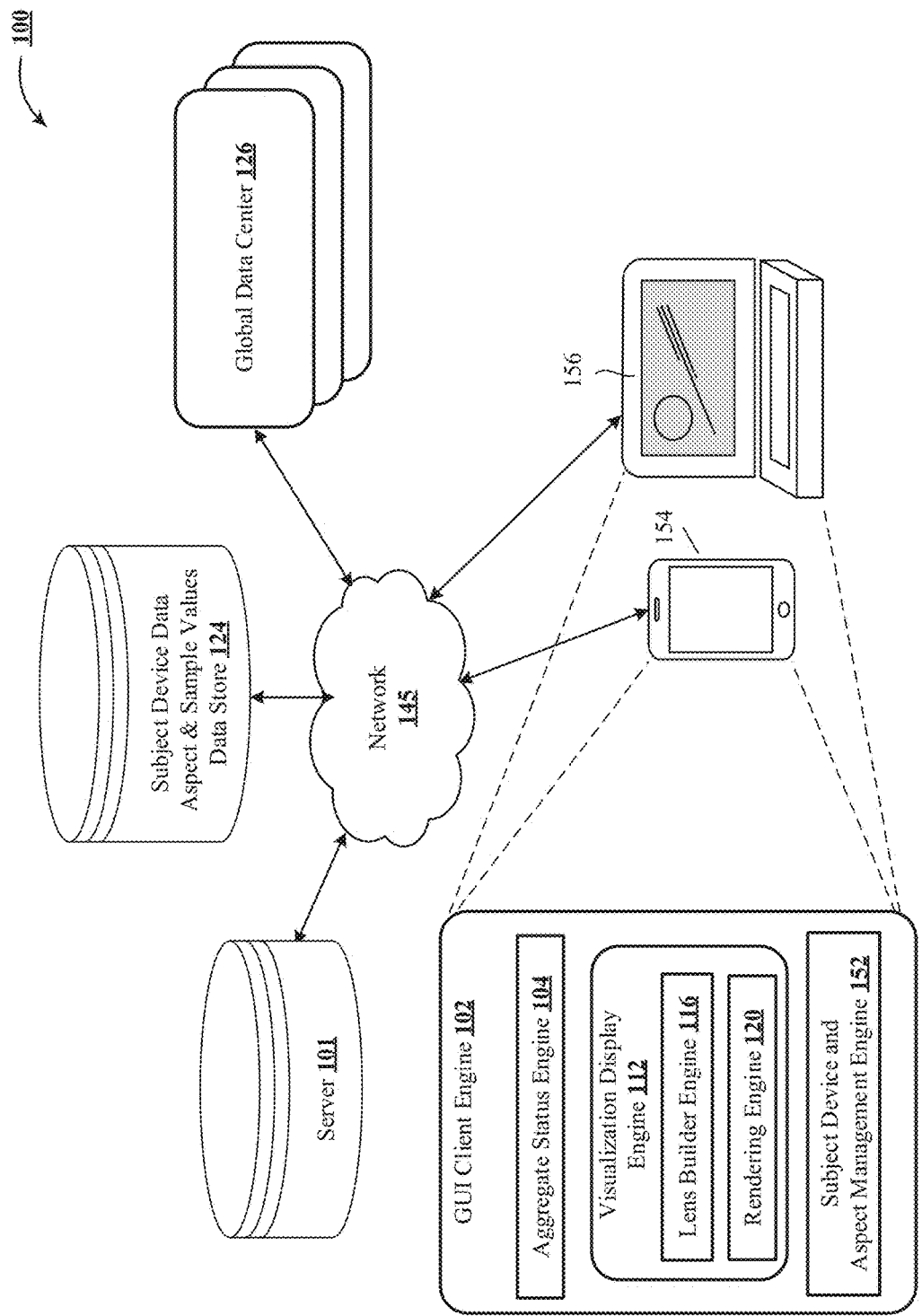
FIG. 1 IoT Monitoring Platform

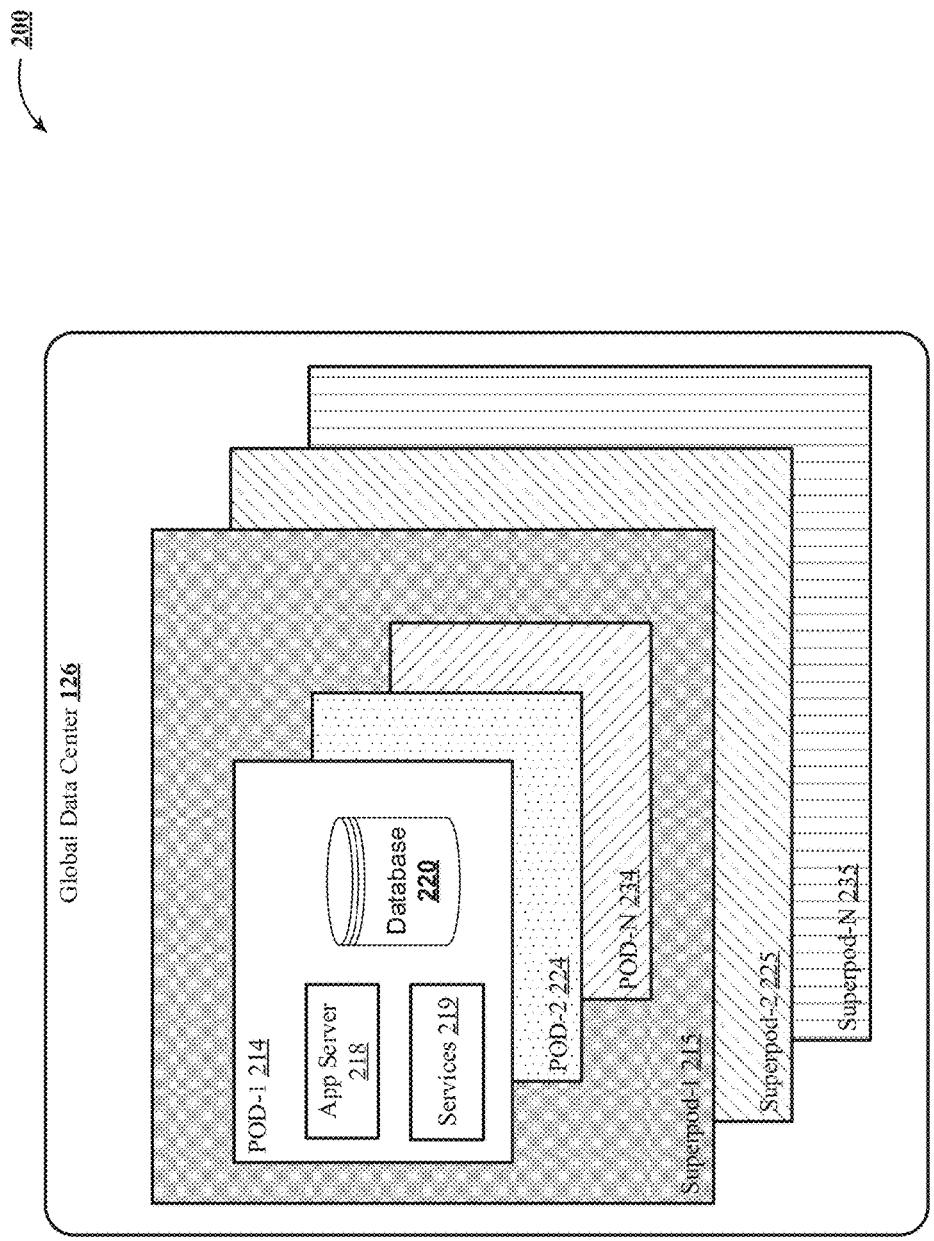
FIG. 2 Global Data Center Example

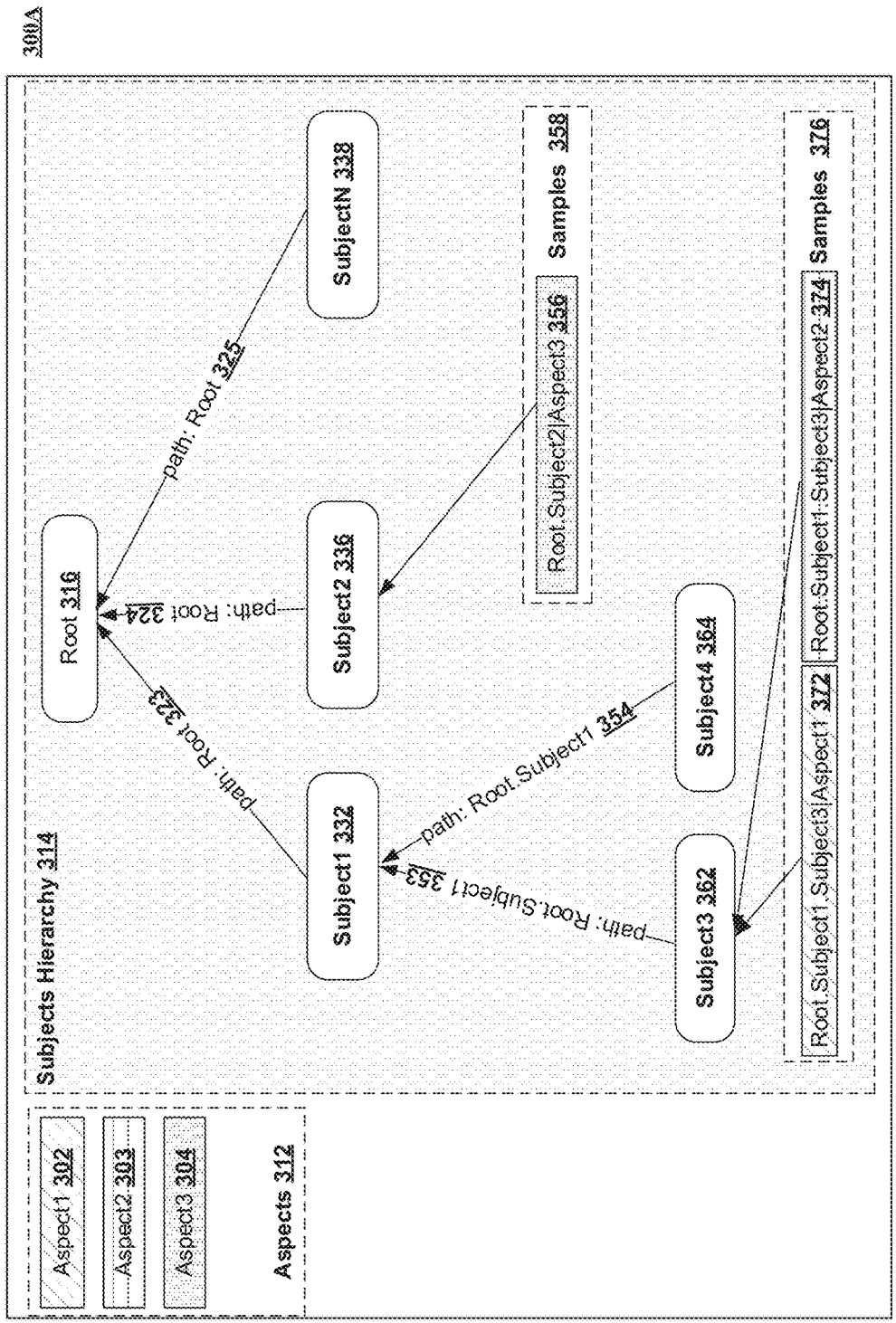
FIG. 3A Example Hierarchical Ecosystem of Objects

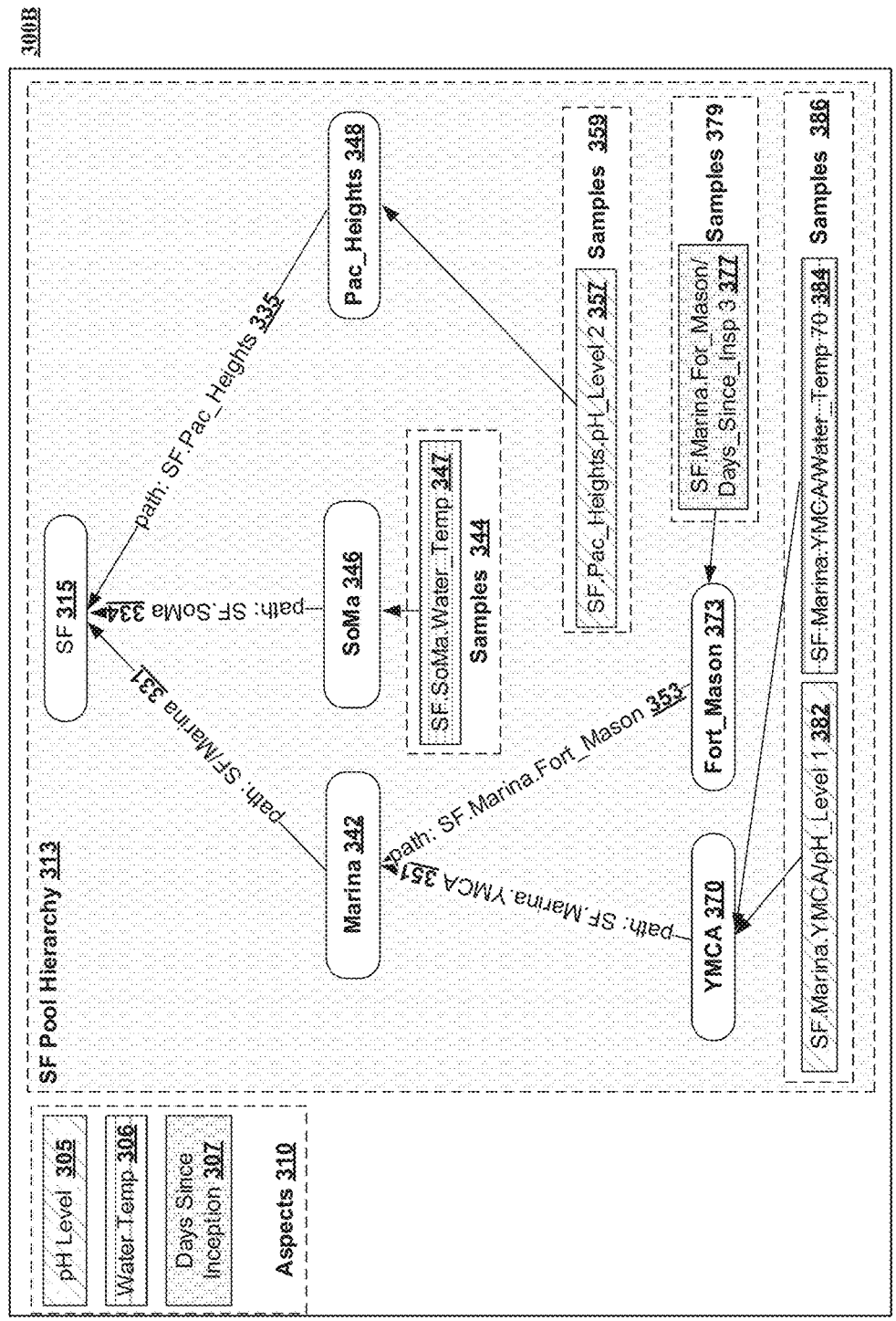
FIG. 3B Example Hierarchy of Monitored San Francisco Pools

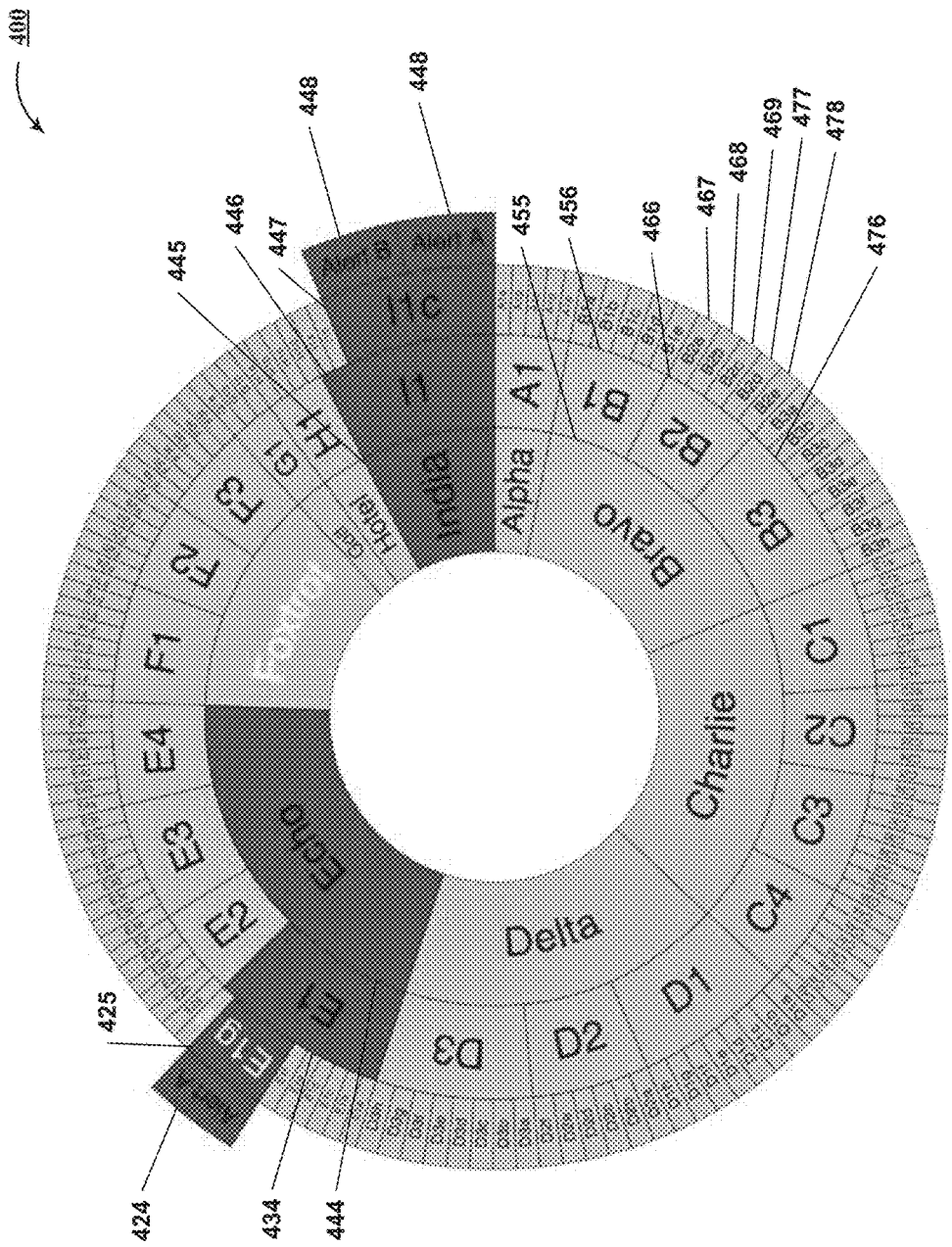
FIG. 4 Sunburst Visualization

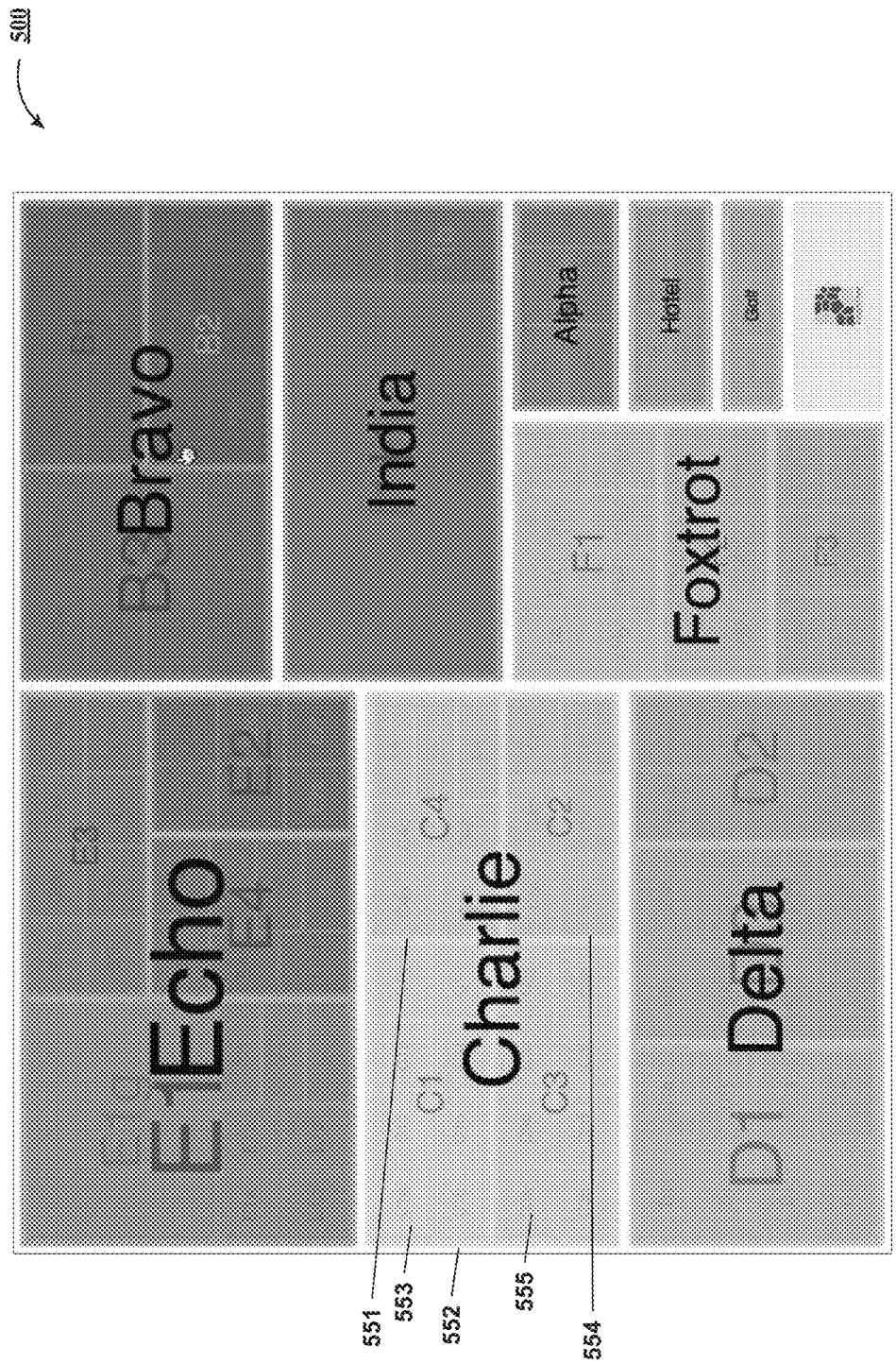
FIG. 5 Treemap Visualization

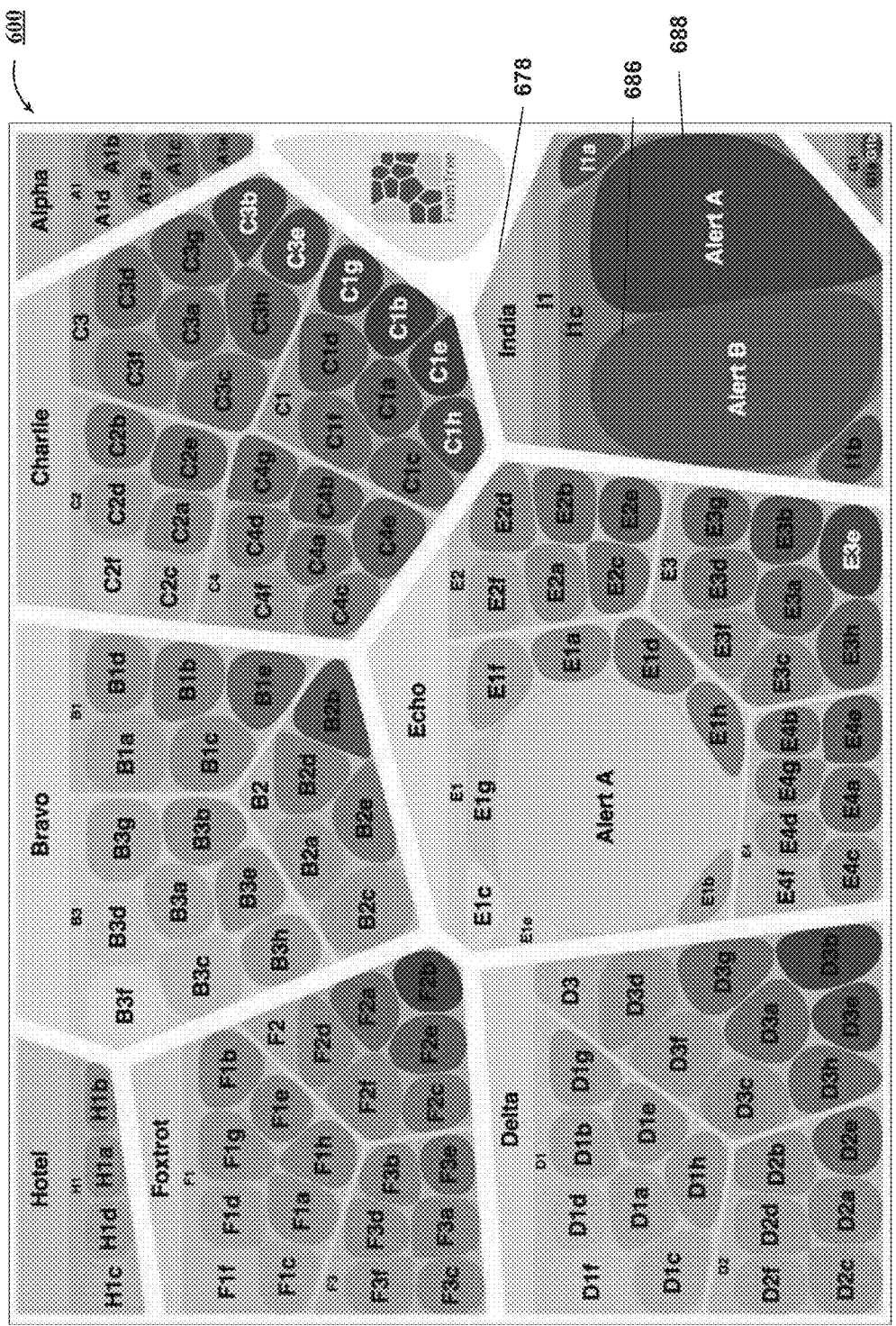
FIG. 6 Voronoi Treemap Visualization

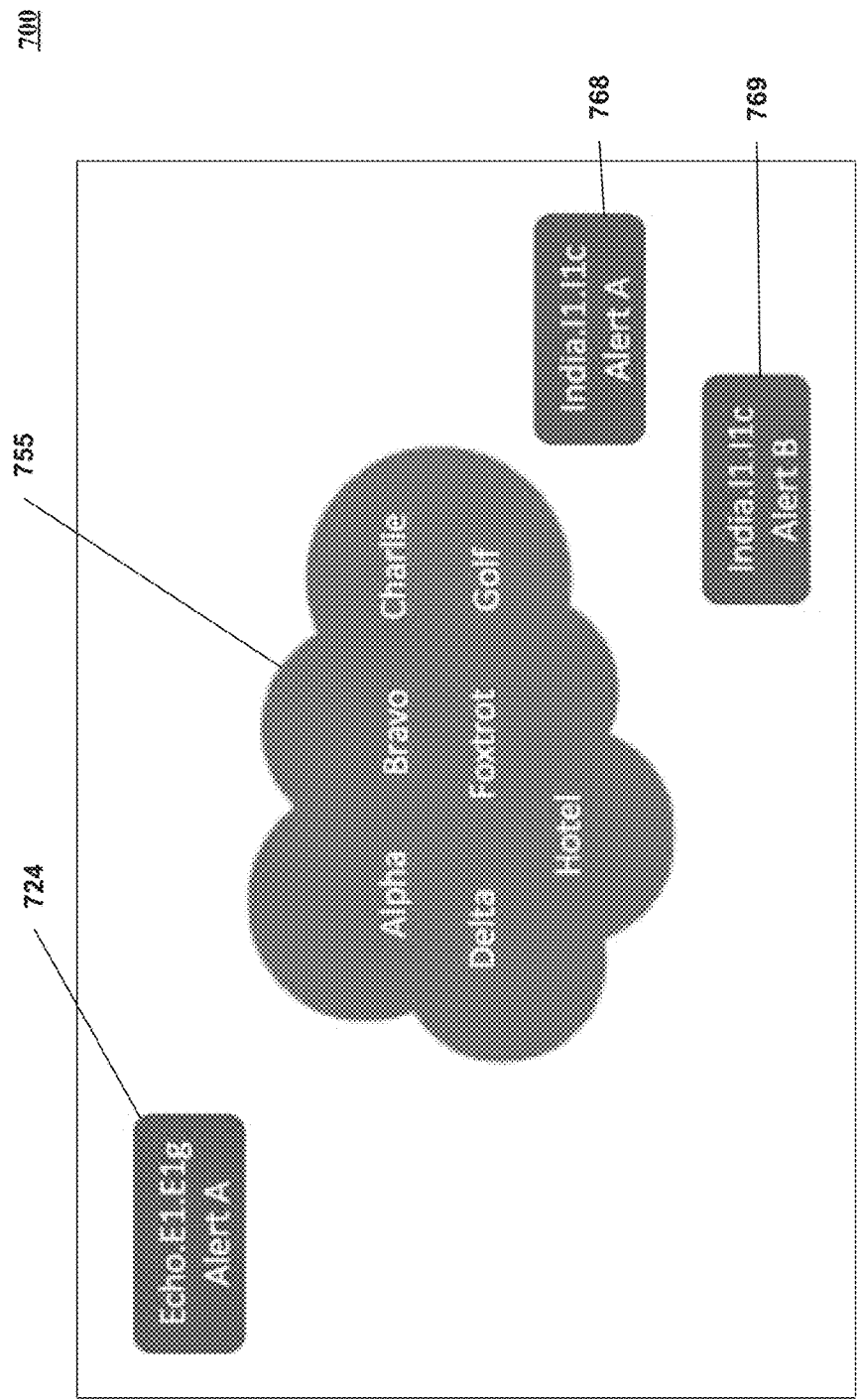
FIG. 7 Cloud Visualization

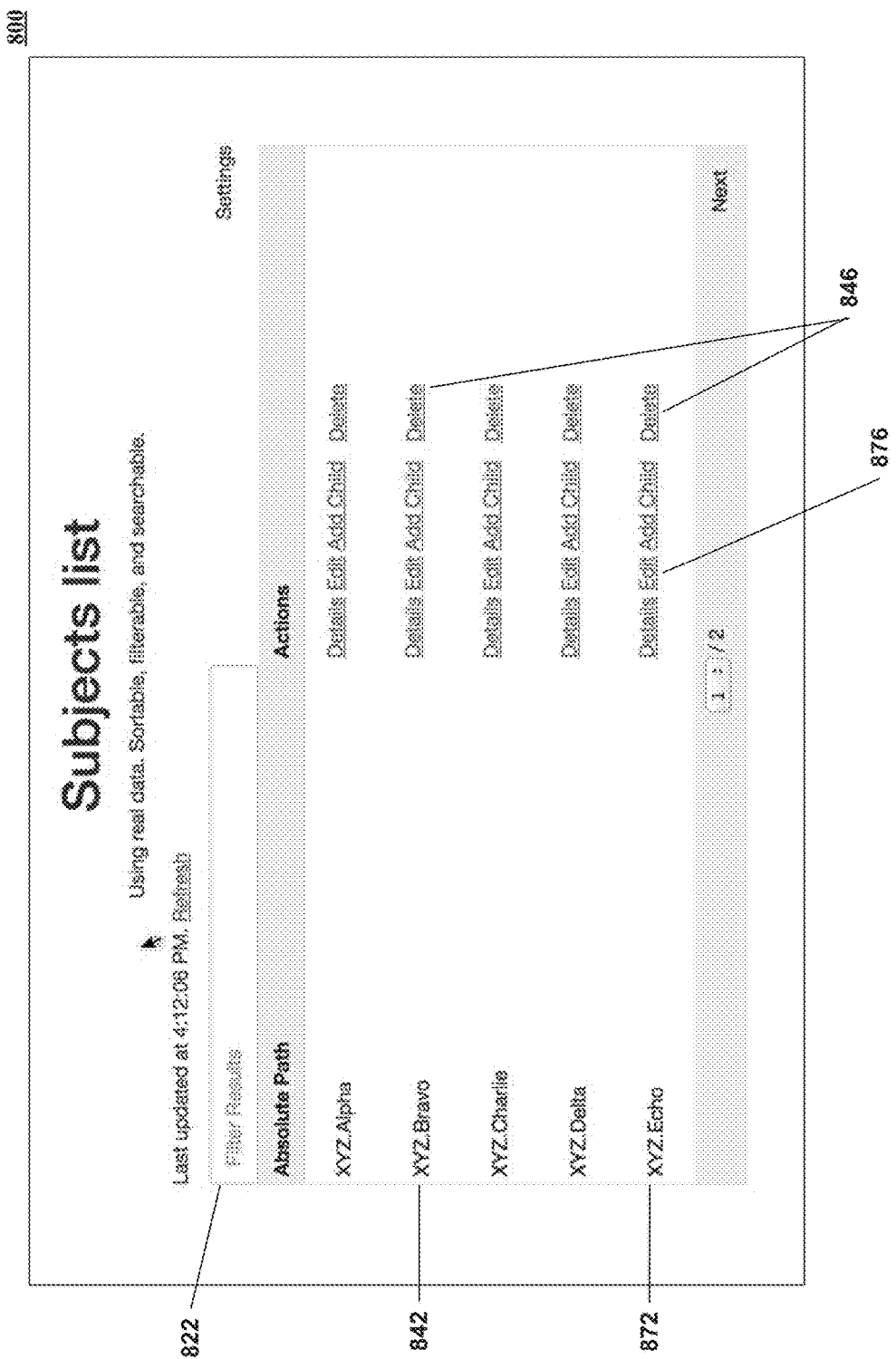
FIG. 8 Subject Configuration Example UI

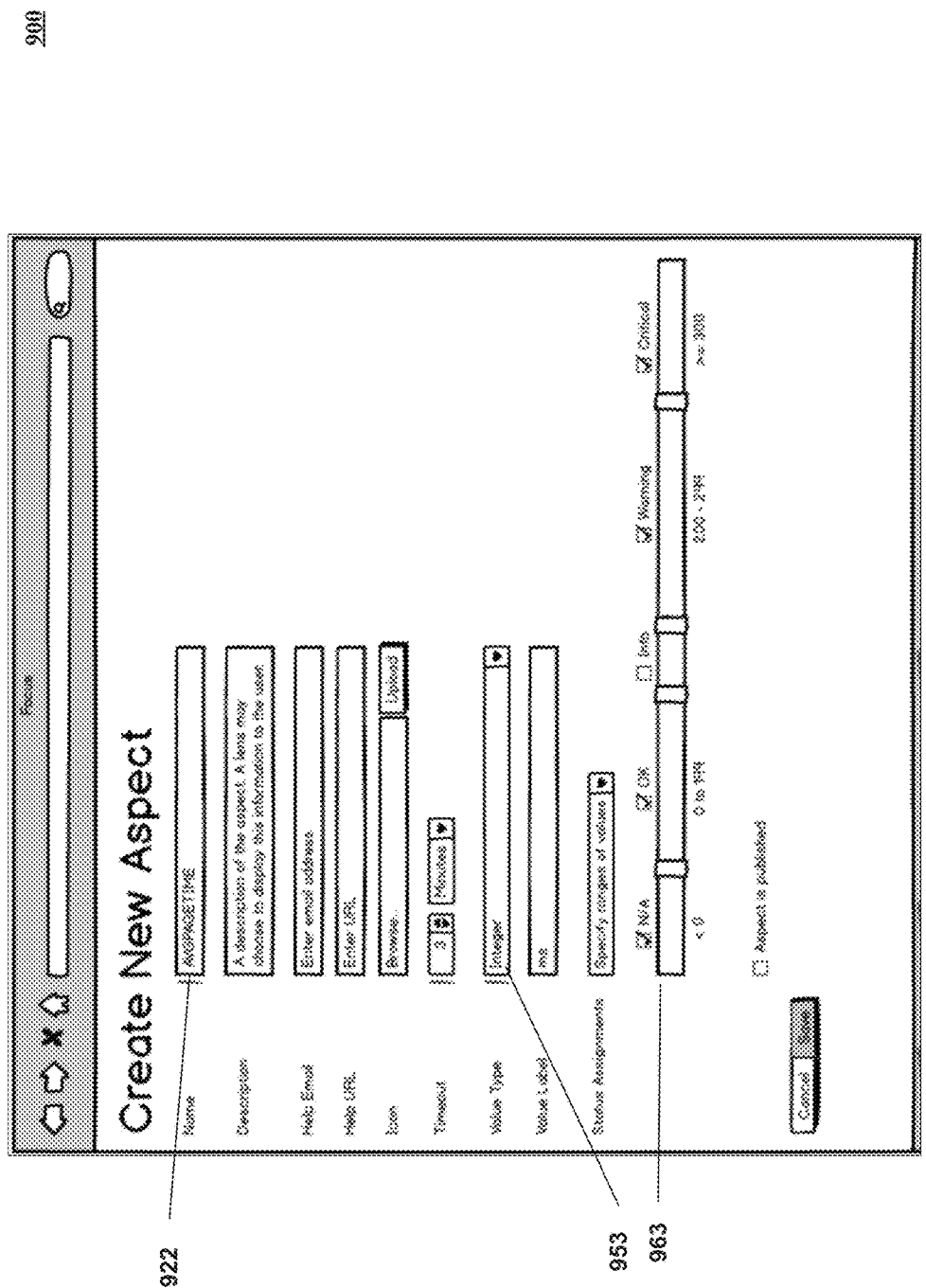
FIG. 9 Create New Aspect Example UI

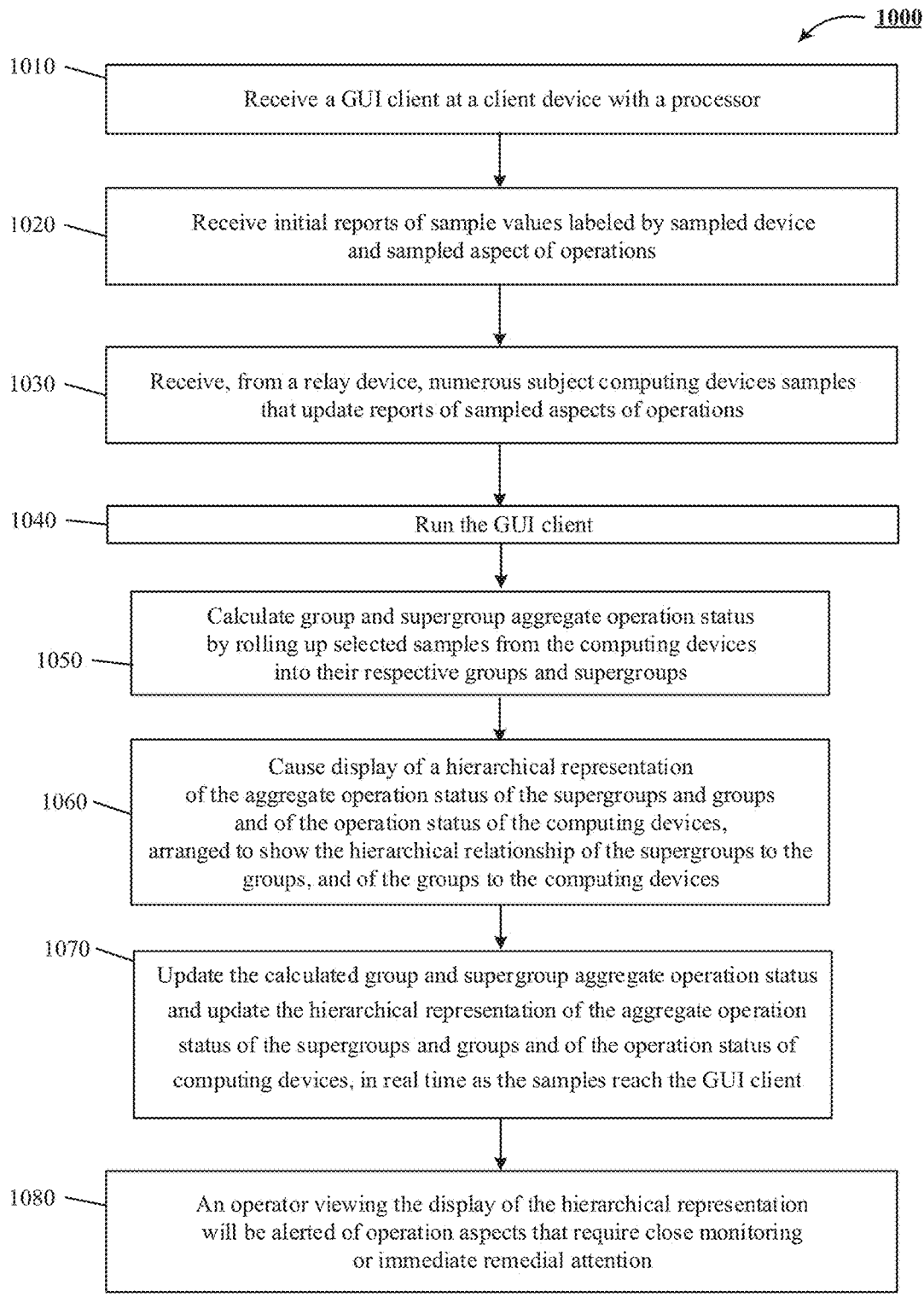
FIG. 10 Workflow Example

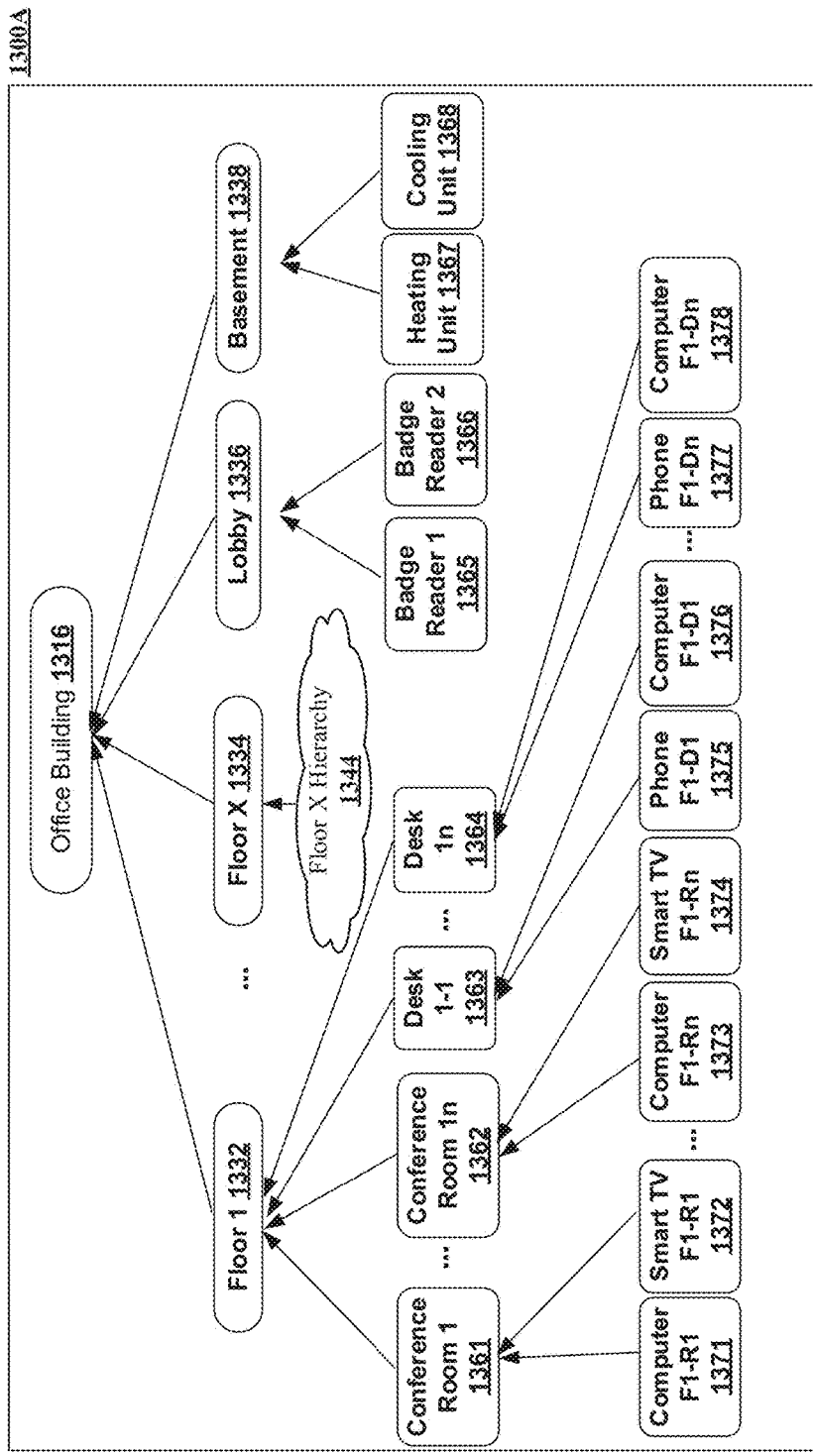
FIG. 13A Example of Disparate Monitoring for Office Building – part 1 of 2

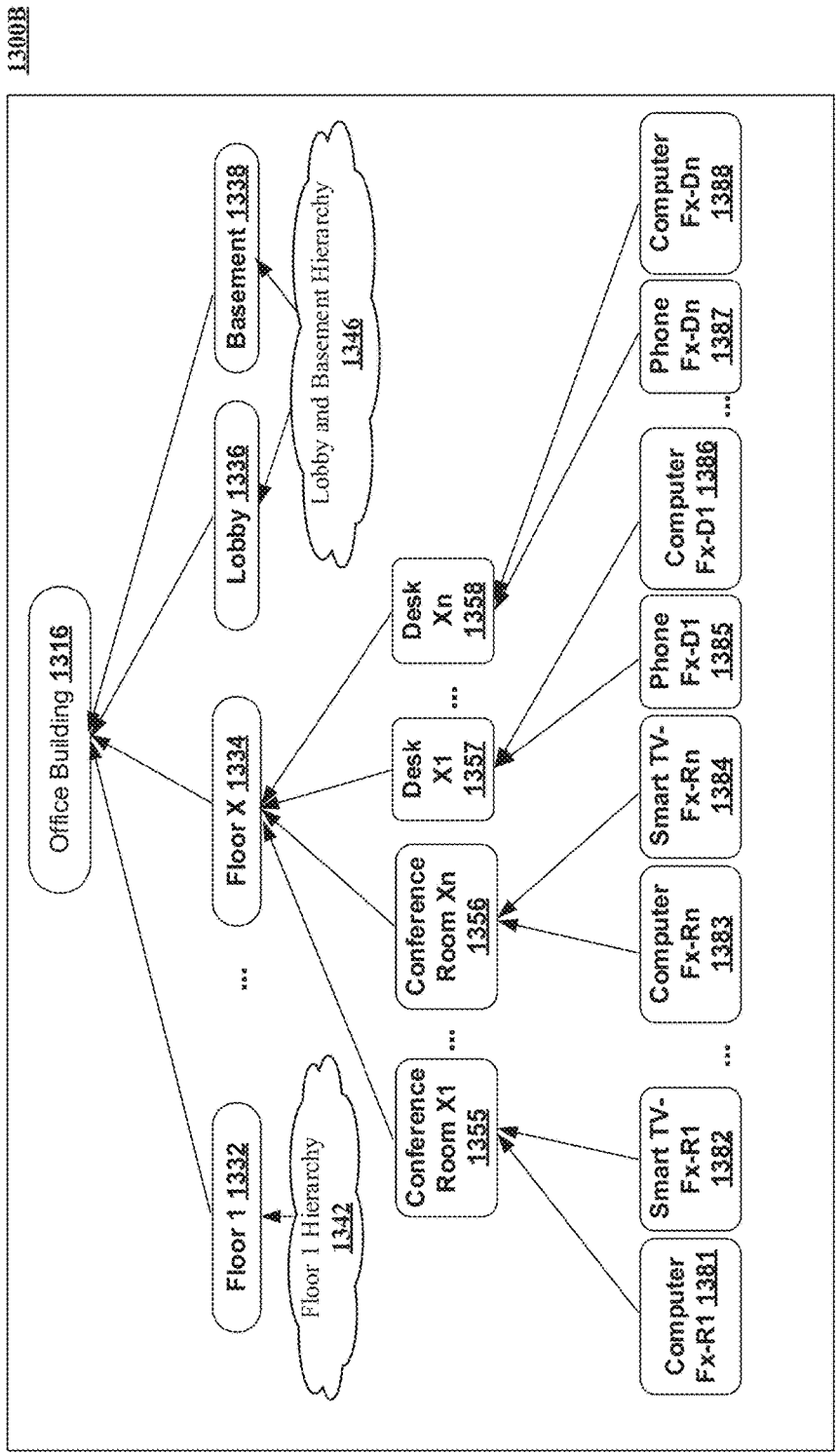
FIG. 13B Example of Disparate Monitoring for Office Building part 2 of 2

DISPARATE MONITORING FOR IOT

FIELD OF THE TECHNOLOGY DISCLOSED

The technology disclosed relates generally to collecting and visualizing aspects of disparate internet-connected devices in the Internet of Things (IoT). By combining hierarchies, relationships, interfaces, and inheritance, the disclosed technology determines and displays the status of various internet-connected devices, and in particular provides a unique means of merging dissimilar data in a way that can be presented together unambiguously.

The disclosed technology additionally includes a platform for customizing aspects to be measured for monitored computing devices. Hierarchical representations graphically depict aggregate operational status updates, which are mapped or linked to the sampled computing devices, based on received sample values received in real time or near real time. The computing devices are each identified by a group membership and a super-group membership and a hierarchical relationship of the super-groups to the groups, and of the groups to the monitored computing devices. Multiple visualization options are disclosed to display the hierarchical representations of the aggregate operational status of the super-groups and groups of devices and of the operational status of the monitored computing devices. Further, an operator viewing the hierarchical representation can be notified of the operational status of aspects which require close monitoring and/or immediate remedial attention.

BACKGROUND

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

Global data centers host thousands of enterprise companies, offering performance and security that enable organizations to serve and manage millions of Internet users of the IoT.

Currently, there is a need to collect and visualize features or aspects of disparate internet-connected devices in a hierarchical ecosystem. Global data centers that process the big data of an IoT ecosystem need to be monitored for reliability by their site reliability engineers. It has become imperative to increase the ability to customize the views needed by different groups of users for monitoring operational status of computing devices and systems.

Therefore, an opportunity arises to provide a platform for simplifying and customizing monitoring of a set of resources, such as those in use for executing big data computing and analytics tasks. Efficient monitoring of global data centers, increased system reliability and uptime percentages, and improved user experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed system for disparate monitoring for the Internet of Things (IoT) can report, store and visualize aspects of disparate internet-connected devices in a hierarchical ecosystem. By combining hierarchies, relationships, interfaces and inheritance in a unique way, the disclosed system can determine and display the status of various internet-connected devices in ways that satisfy the monitoring requirements for many use cases. In one implementation, the disclosed technology provides a method of reporting and visualizing the state of a company's infrastructure. We describe four use cases infra.

The technology disclosed offers a method of updating a data cube of samples and a display on a client device with a processor, including receiving a GUI client at a client device with a processor and receiving, at the GUI client, initial reports of sample values that are labeled by sampled computing device and sampled aspect of operations, wherein the monitored computing devices are each identified by at least a group membership and a super-group membership and a hierarchical relationship of the super-groups to the groups, and of the groups to the computing devices. The method includes receiving, from a relay device, numerous samples from computing devices that update the reports of sampled aspects of operations;

A GUI client, at a client device with a processor, calculates group and super-group aggregate operational status by rolling up selected samples from the computing devices into their respective groups and super-groups; and causes display of a hierarchical representation of the aggregate operational status of the super-groups and groups and of the operational status of the computing devices, arranged to show the hierarchical relationship of the super-groups to the groups, and of the groups to the computing devices. Additionally, the GUI client updates the calculated group and super-group aggregate operational status and updates the hierarchical representation of the aggregate operational status of the super-groups and groups and of the operational status of computing devices, in real time as the samples reach the GUI client. An operator viewing a display of the hierarchical representation will be notified of the operational status of aspects that may require close monitoring and/or immediate remedial attention. "Real time" as used herein, is defined to be as instantly as possible.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 depicts an environment for disparate monitoring of an exemplary IoT platform.

FIG. 2 illustrates a global data center usable in the IoT platform example shown in FIG. 1, according to one implementation of the technology disclosed.

FIG. 3A is one implementation of a hierarchical ecosystem of objects for a system for disparate monitoring for IoT.

FIG. 3B shows an example hierarchical system of objects for disparate monitoring of a municipal pool system.

FIG. 4 illustrates one implementation of a sunburst visualization of the aggregate operational status of the subject of disparate monitoring for IoT.

FIG. 5 illustrates one implementation of a treemap visualization of the aggregate operational status of the subject of disparate monitoring for IoT.

FIG. 6 illustrates one implementation of a Voronoi visualization of the aggregate operational status of the subject of disparate monitoring for IoT.

FIG. 7 illustrates one implementation of a cloud visualization of the aggregate operational status of the subject of disparate monitoring for IoT.

FIG. 8 illustrates one GUI example for selecting subject computing devices to be monitored.

FIG. 9 illustrates a GUI example for creating new aspects for use when monitoring computing devices.

FIG. 10 shows one implementation of a flowchart of updating a data cube of samples and a display on a client device with a processor.

FIG. 13A shows one example of disparate monitoring for an office building.

FIG. 13B shows details for monitoring of floor X of the office building shown in FIG. 13A.

DETAILED DESCRIPTION

Figure 11:
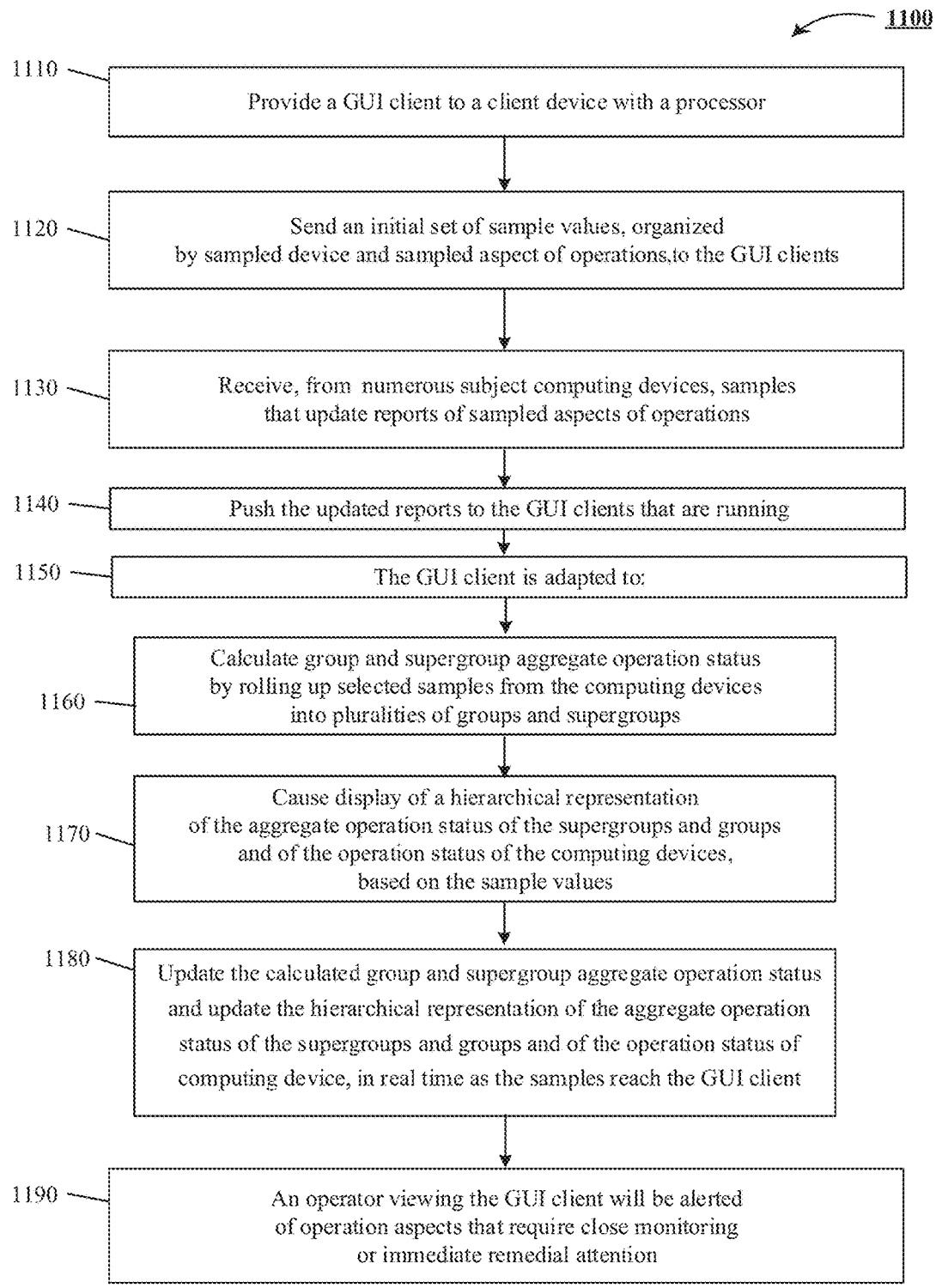
FIG. 11 shows one implementation of a flowchart of updating a data cube of samples and causing status displays on operator computer devices.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The Internet of Things (IoT) is a new revolution of the Internet. The Internet of Things (IoT) platform is defined as an integrated environment that collects and processes a high volume of data from a plurality of entities in real-time or near real-time, often with low latency. Objects (things) make or enable context-related decisions that render them recognizable by and able to obtain information from other objects, thanks to the fact that they can communicate information about themselves.

One role of the IoT is to connect device data to user success platforms for engaging customers through sales, customer service, marketing, communities, applications and analytics. The IoT is built on the foundation of big data, which is flowing through every sector of the global economy.

Up until recently, monitoring of the global data centers that process and store big data utilized visualizations composed of tables of data representing monitoring results for a single level of stack. As an alternative, the disclosed technology provides a unique way of merging dissimilar data in a way that can be presented together unambiguously, for disparate monitoring of the global data centers.

The disclosed technology includes a platform that users can customize for monitoring subject devices of interest and measures that apply to the subject devices being monitored. In one implementation, site reliability engineers can specify which subject devices in which groups and super-groups will be monitored, and can customize what aspects are measured and used to calculate aggregate operational status, to enable diagnosis of network bottlenecks. Sample data can be received from any source that can post a defined JavaScript Object Notation (JSON) object to the system, which pushes updates out to any GUI clients listening for those particular updates. The GUI client calculates and updates a hierarchical representation of the aggregate operational status of the super-groups and groups and of the operational status of the devices.

The reliability of global data centers is central to the IoT revolution and data security is critical for customers. Site reliability engineers need to be able to monitor global data centers that deliver the IoT to ensure reliability and security. These needs provide motivation for the disclosed technology for disparate monitoring for IoT.

We describe a system and implementation of disparate monitoring for IoT, with reference to FIG. 1 which shows an architectural level schematic. Because FIG. 1 is an architectural diagram, certain details are intentionally omitted to improve the clarity of the description. FIG. 1 includes exemplary IoT monitoring platform 100, which includes global data center 126, GUI client engine 102 and data store 124. Global data center 126 is described in detail infra, relative to FIG. 2. Additionally the system includes network 145, mobile device user interface 154 and computer device user interface 156.

GUI client engine 102 includes aggregate status engine 104, visualization display engine 112, server 101 and subject device and aspect management engine 152. Aggregate status engine 104 receives reports of data sample values, as they reach the GUI client engine 102, for use in visual representations of the health of the monitored subjects, and calculates group and super-group aggregate operational status and updates the calculated status. Server 101 includes a relay device which receives numerous samples from computing devices that update the reports of sampled aspects of operations. In some implementations, the GUI client communicates with server 101, which receives updates from monitored devices. A ping signal from the GUI client to server 101 indicates that the GUI client is running. Individual monitored subject devices do not communicate directly to the GUI client. A sampled or monitored device can be a device from a group consisting of but not limited to servers, application servers, databases, file systems, search services, measurement instruments—such as those at a swimming pool or in a modern building, and additional IoT-connected devices.

Visualization display engine 112 includes lens builder engine 116 and rendering engine 120. When updates occur for the hierarchical representation of the aggregate operational status of the super-groups and groups and of the operational status of monitored computing devices, the visualization display engine 112 updates the display to reflect the changes. Lens builder 116 allows contributors to develop alternative ways of visualizing the data via lenses which graphically depict the health of subject computing devices, based on the status updates for the particular subject devices. Accurate live monitoring results are produced and can be displayed via multiple customizable visualization representation options. Rendering engine 120 transforms the hierarchical representation of the aggregate operational status of the super-groups and groups and of the operational status of the computing device, into rendered graphics. In other implementations, visualization display engine 112 may not have the same elements as those listed above and/or may have other/different elements instead of, or in addition to, those listed above.

Subject device and aspect management engine 152 includes a graphical user interface for configuring subject devices and aspects to be monitored. Device configuration includes naming, specifying geolocation, and describing the subject devices to be monitored. Aspect management includes configuring aspects to be monitored by the devices, including names, descriptions, value types, value labels, status assignments and mappings of sample value to status. Example aspects are described infra.

In one implementation, IoT monitoring platform 100 can be located in a cloud-computing environment which may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of IoT monitoring platform 100 can be engines of varying types including workstations, servers, computing clusters, blade servers, server farms, mobile devices or any other data processing systems or computing devices. The elements or components can be communicably coupled to the databases via a different network connection. For example, global data center 126 can be coupled via the network(s) (e.g., the Internet), GUI client engine 102 can be coupled via a direct network link, and data store 124 can be coupled by yet a different network connection.

In some implementations, databases used in IoT monitoring platform 100 can store information from one or more tenants into tables of a common database image to form a multi-tenant database system. A database image can include one or more database objects. In other implementations, the databases can be relational database management systems (RDBMS), object oriented database management systems (OODBMS), distributed file systems (DFS), no-schema database management systems, or any other data storing systems or computing devices.

The disclosed IoT monitoring platform 100 makes it possible for users to select subject devices and metrics of interest to them for monitoring, and to use the status updates from the subject computing devices, generating for display visual representation data that graphically depicts the aggregate operational status of the subject devices.

While IoT monitoring platform 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

The data access layer—the "backend" of the disclosed IoT monitoring technology—includes three main objects that, when combined, provide a unique way of merging dissimilar data in a way that can be presented together unambiguously. The subject computing devices to be monitored, the aspects to be monitored, and the data samples are the three main object types. Each of these three object types is described in detail infra. We describe four use cases of the disclosed disparate monitoring for IoT for implementations that answer distinct business needs.

In one use case, the devices to be monitored include a global data center, and can include super-pods (SP) and points of deployment (PODs), in one example. Super-pods offer dedicated connections and guaranteed data residency for security and governance-minded organizations that need to identify their network in a specific datacenter in a chosen country; and need to have the option of auditing and encrypting it in specific selected ways. Each pod can serve tens of thousands of customers with multi-tenant services. Additional use case examples are described infra.

For this first use case, global data center 126, shown in FIG. 2, includes super-pods 215, 225 and 235, each of which includes similar components. Super-pod 215 contains POD 214, POD 224 and POD 234, and each POD includes a logical grouping of hosts. In one example, the monitoring of a global data center infrastructure tracks one hundred pods using the disclosed disparate monitoring technology. POD 214 includes app server 218, adjacent services 219 including file system and search services, and database 220. In one implementation, a company allocates a customer to a single POD where their data resides. In common use, multiple customers rely on a single POD—a self-contained unit that contains everything required to run an instantiation of a company's services.

An aspect is a global feature for customized monitoring of a set of resources—that is, an aspect is a descriptor of a particular feature or measured performance quality of a subject device. One aspect can be applied to a hundred subject devices, to zero subject devices, or to some other number of subject devices. The customers who want to use a given aspect all make use of the same set of potential values for the aspect.

In general, sample values that describe the current state of a subject device are provided by various disparate sources. Sample values are organized by the sampled device and by the sampled aspect of operations; each sample value is one measurement of one aspect for one subject device. As an example, an average-page-time sample value for aspect average page time maps to a specific subject device (pod). Aspect interpretation rules can be used to determine aspect statuses for the data samples. A received sample can be timestamped.

Example aspects include login—a Boolean with a status of ok if the monitoring system was able to successfully login to the subject device being monitored; and ping—a Boolean with a status of "ok" if the subject device under monitoring was able to successfully send an 'up' message to its ping sample, depicting that it is alive and can reach the Internet. Additional aspects can include temperature—a number that represents the temperature of the device being monitored—in Celsius. The aspect interpretation rules for temperature determine that the status will be "ok" if the temperature is less than 50 degrees Celsius, with a status of "warning" if the temperature is between 50 and 70 degrees, and a status of "critical" if the temperature is greater than 75 degrees Celsius in one example implementation. Another example aspect is CPU utilization whose samples are represented as a percentage and whose aspect rolls up to "ok" if the measured sample value is under x percent, "warning" if between x percent and y percent, and "critical" if over z percent. Example aspect—average response time—is measured as an integer in milliseconds (ms), and operational status for that aspect is calculated as a status of "ok" if the sampled value is less than x ms, "warning" if between x ms and y ms, and "critical" if greater than z ms. Example aspect—average response time deviation—represents the standard deviation of a subject's response time relative to the running average of response times. Status is "ok" if the sampled value is zero, "warning" if the value is one, and "critical" if the sampled value is two or three. The aspects described serve as examples. A user can create and configure aspects that effectively measure quantities and qualities of interest for a specific ecosystem of disparate objects to be monitored.

In this first use case, the hierarchical ecosystem of objects represents subject devices to be monitored in a global data center. In the example subjects hierarchy 314 shown in the hierarchical system 300A in FIG. 3A, the global data center represented by root 316 receives samples for subject1 332 via path: root 323, for subject2 336 via path: root 324, and for subject N 338 via path: root 325. Aspects 312 include aspect1 302, aspect2 303 and aspect3 304. An example sample, root.subject2|aspect3 356, is one of the samples 358 that refer to subject2 336, which is included in the root 316 global data center. In turn, sample root.subject1.subject3|aspect1 372 and root.subject1.subject3|aspect2 374 sample apply to subject3 362. In one example embodiment of the disclosed technology, Salesforce delivers infrastructure via multiple global data centers, one of which, Chicago (CHI), is represented by root 316. Subject1 332 represents a SP that includes subject3 362 which represents a pod labeled NA5 and subject4 364 which represents a pod labeled NA6. Both pods share ancestors of Salesforce and CHI but diverge at the super pod.

In a second use case, example system 300B in FIG. 3B shows a San Francisco pool hierarchy 313 of objects being monitored. The SF municipal pool monitoring system 315 receives samples for Marina 342 via path: SF.Marina 331, for SoMa 346 via path: SF.SoMa 334, and for Pac_Heights 348 via path: SF.Pac_Heights 335. Aspects 310 include pH level 305, water temp 306 and days since inception 307. Samples 344, 359, 379, 386 include example sample SF.SoMa|Water_Temp 347 for SoMa 346, SF.Pac_Heights|pH_Level2 357, for Pac_Heights 348, SF.Marina.-Fort_Mason|Days_Since_Insp 3 377 for Fort Mason 373, and SF.Marina.YMCA|pH_Level 1 382 and SF.Marina.YMCA|Water_Temp 70 384 for YMCA 370.

In a third example use case a system is configured to monitor mission critical support (MCS) for an enterprise company, to increase visibility into the health and status of each of the high-paying customers they support. For example, the system can include as a top-level subject MCS, with each MCS representative set up as a child subject, and each customer of the representative set up in the hierarchy as a child subject under their designated representative. That is, in this scenario, each customer org can be a subject to be monitored. Examples of aspects to be monitored for each customer org can include at least one of the following aspects: total number of users currently logged in, number of concurrent-Apex-limit-exceeded errors, maximum Apex run time, number of connection pool timeout exception errors, number of callout failure errors, number of row lock errors, sites access count, number of long-running Apex Soap calls, number of requests waiting for connection, number of bulk API batch limit hits, and number of knowledge article views. Selected samples from the monitored subjects can be rolled up into their respective customer groups and MCS representative super-groups, and a hierarchical representation of the aggregate operational status of the super-groups and groups, and the dynamic monitoring system results that show health and status for the high-paying customers can be displayed.

We describe a fourth use case for the disclosed IoT monitoring platform 100 for monitoring of a modern office building. The maintenance team for a building can use a display of the status of multiple aspects of multiple devices in multiple rooms on multiple floors—and can be notified of operational aspects that require close monitoring or immediate remedial attention. FIG. 13A shows a hierarchy of subjects to be monitored for office building 1316. Each of the super-groups: floor 1 1332 to floor X 1334, lobby 1336 and basement 1338, includes multiple groups of child subject devices under monitoring. The group for floor 1 1332 includes conference room 1 1361 through conference room 1n 1362, and desk 1-1 1363 through desk 1n 1364. In conference room 1 1361, computer F1-R1 1371 and smart TV F1-R1 1372 are subject devices under monitoring. Similarly, each additional conference room, two through n, includes a computer and smart TV to be monitored. Disparate monitoring for office building 1316 can be customized to include as many floors as are applicable, and can include as many conference rooms and desks per floor being monitored, as needed.

In this fourth use case, sample measurements for aspects associated with computer F1-Rn 1373 and smart TV F1-Rn 1374 are reported for conference room 1n 1362; desk 1-1 1363, includes two monitored child devices: phone F1-D1 1375 and computer F1-D1 1376; and similarly, desk 1-n 1364 includes two monitored child devices: phone F1-Dn 1377 and computer F1-Dn 1378. Two aspects of interest, to be measured in each of the conference rooms include "temperature" and "lights in use". Aspects for computer F1-R1 1371 and computer F1Rn 1373 devices can include "logged in", "OS version", "number of monitors", "energy consumption", and "days in operation". "Wi-Fi enabled" and "camera on" are two aspects of interest for each of the two TVs: smart TV F1-R1 1372 and smart TV F1-Rn 1374. An aspect of interest for phone F1-D1 1375 and phone F1-Dn 1377 is "calls waiting".

Continuing with the office building monitoring use case, FIG. 13B shows an example implementation of devices to be monitored in floor x hierarchy 1344. The group for floor X 1334 includes conference room X1 1355 through conference room Xn 1356, and desk X1 1357 through desk Xn 1358. In conference room X1 1355, computer Fx-R1 1381 and smart TV Fx-R1 1382 are child devices under monitoring. Similarly, each additional conference room, two through n, includes a computer and smart TV to be monitored. Sample measurements for aspects associated with computer Fx-Rn 1383 and smart TV Fx-Rn 1384 are reported for conference room Xn 1356. Desk 1X1 1357 includes two monitored child devices: phone Fx-D1 1385 and computer Fx-D1 1386. Similarly, desk Xn 1358 includes two monitored child devices: phone Fx-Dn 1387 and computer Fx-Dn 1388. Aspects can be configured for each floor to be monitored. Details for floor 1 hierarchy 1342 and lobby and basement hierarchy 1346 are shown in FIG. 13A. Lobby 1336 includes badge reader 1 1365 and badge reader 2 1366; basement 1338 includes heating unit 1367 and cooling unit 1368. An aspect of interest for each of the two badge readers is whether the reader is "active". For basement 1338, for heating unit 1367, we are interested in "energy consumption" and "days since inspection". For the cooling unit 1368, maintenance aspects of interest include "energy consumption" and "days since inspection".

Sample values are labeled by sampled computing device and sampled aspect of operations, with the computing devices identified by at least a group membership, a super-group membership and a hierarchical relationship of the super-groups to the groups, and of the groups to the computing devices; and numerous samples from computing devices are used to update the reports of described sampled aspects of operations. Status updates from the subject devices are included in the display of visual representation data that graphically depicts the aggregate operational status of the subject devices.

The disclosed disparate monitoring system can be configured by the user to render dynamic system monitoring data displayed via multiple hierarchical representation visualizations, including sunbursts, tree maps, tables and trees, which are described infra.

Visualizations for the disclosed disparate monitoring technology are dynamic, i.e. the display refreshes in real time as the calculated aggregate operational status gets updated. Samples from computing devices under observation can be pushed via a secure representational state transfer (REST) API—an architecture that includes a stateless, cacheable, uniform interface. That is, the necessary state to handle the request is contained within the request. Samples from computing devices include identification of the super-group and the group membership of the computing device. For some implementations, received samples include a unique device ID that correlates with the super-group and the group membership of the computing device.

Aggregate operational status of a subject computing device can be assessed using multiple aspects or measures, by rolling up selected samples from the computing devices into their respective groups and super-groups. For example, operational aspect samples of the average page time can be classified into a category selected from five or fewer categories. That is, an average page time (APT) sample arrives as a numeric value. The APT aspect configuration includes rules that specify that for received data sample values between zero and 199 milliseconds, the system status is 'OK', for values between 200 and 299 milliseconds the system status is 'warning', and for sample values greater than 300 milliseconds the status is 'critical'. If a received APT sample is less than zero, something is wrong.

In one implementation, the data sample for a computing device and aspect of operations must be received within a specified timeout configured for the aspect. For example, if timeout is set to 500 milliseconds (ms) for APT, and no data sample is received within 500 ms, then the status for APT becomes "timed out".

In one example implementation, a GUI client program can be used to calculate group and super-group aggregate operational status: rolling up that status to the computing device being monitored, across all its samples, by representing the status of the subject computing device as the most severe status based on all its samples and all the samples associated with any of its descendants. For example, if a subject computing device labeled "CHI.SP1.NA14" (Chicago, superpod 1, POD NA14) has a status of "critical" for its login aspect, and the samples for the other aspects on "CHI.SP1.NA14" have status "OK", then the group and super-group aggregate operational status calculated by rolling up the status to represent "CHI.SP1.NA14" would be "critical", i.e. the most severe status from any of the samples associated with that subject. Similarly, aggregate operational status for "CHI.SP1" (the super-group "CHI.SP1.NA14"), will also be "CRITICAL", even if all the other pods in that super-pod were "OK". That is, for the example implementation, the aggregate operational status is set to the most severe status from any of the samples associated with that subject and any of its descendants.

The disclosed hierarchical representation visualizations are interactive. Users can zoom in and out to different levels of the hierarchy, i.e. the visualization is re-rendered with the specified node as the logical root at the center of the display. Users can increase/decrease relative size of healthy vs. unhealthy system displays to focus user attention to operational aspects that require close monitoring or immediate remedial attention. Users can toggle between a hierarchy-based color scheme and a health-based color scheme. The hierarchy-based color scheme uses variations in color to signal parent-child relationships. The health-based color scheme uses variations in color to signal system health. Users can click or hover on systems to display details. FIG. 4, FIG. 5, FIG. 6 and FIG. 7, described next, show multiple visualization implementations.

Sunburst visualization 400, in FIG. 4, illustrates one rendering of hierarchical and dynamic system monitoring data. The sunburst visualization presents hierarchical data in a radial layout. When used to render system monitoring data, each region represents a particular component of the system under observation, with the logical root level of the hierarchy nearest to the center of the display. For example Bravo 455 represents a specific global data center. Successive levels of the hierarchy radiate out from their parent, further and further away from the center. In the example, B1 456, B2 466 and B3 476 represent superpods in the Bravo global data center represented as Bravo 455. Superpod B2 466, in Bravo 455, includes PODs B2a 467, B2b 468, B2c 469, B2d 477 and B2e 478. Similarly, each of the additional super-pods—B1 456 and SP3 464—includes a series of PODs represented in the sunburst.

The example hierarchy described for FIG. 3B and the building hierarchy described relative to FIG. 13A and FIG. 13B supra show use case examples in which multiple levels of hierarchy are included within a single IoT monitoring system. For the office building use case, the lobby and basement each include a single level of monitoring—badges for the lobby, and heating and cooling for the basement. In contrast, the other floors of the building have conference rooms and desks, each of which includes a group with multiple devices under monitoring. For implementations with multiple levels of hierarchy, the outer edge of the sunburst visualization can reflect the multiple levels of hierarchy via a sawtooth waveform.

The size, color and label of each ray in the example sunburst communicate additional information about the state of the IoT system being monitored. Data samples from computing devices include group membership, super-group membership and a hierarchical relationship for the device. For example, Alert A 424 is calculated as the aggregate operational status for global data center Echo 444, based on received sample values for computing devices in the hierarchy represented as group E1g 425, which is, in turn, part of super-group E1 434, which is a superpod in global data center Echo 444. The aggregate operational status is calculated by rolling up selected samples from the computing devices into their respective groups and super-groups. Similarly, Alert A 449 and Alert B 448 are calculated as the aggregate operational status for global data center India 445, which includes super-group I1 446 and group I1c 447.

FIG. 5 depicts the rendering of treemap visualization 500—a hierarchical representation of the aggregate operational status of the super-groups and groups and of the operational status of the computing devices, arranged to show the hierarchical relationship of the super-groups to the groups, and of the groups to the computing devices. Treemap visualization 500 displays hierarchical data as a set of nested rectangles, with multiple global data centers depicted. Each branch of the tree is given a rectangle, which is then tiled with smaller rectangles representing sub-branches. Charlie 552 is one branch of the tree, which includes super-groups C1 553, C2 554, C3 555 and C4 551. When used to render system status display for disparate IoT devices, each rectangle represents a particular component of the system under observation, nested inside of its parent component. The size, color, label and thumbnail image within each rectangle can transmit additional information about the state of the system under observation.

FIG. 6 shows hierarchical and dynamic system monitoring data rendered using a Voronoi treemap 600 visualization, which presents hierarchical data by recursively partitioning convex polygons using weighted centroidal Voronoi diagrams. Global data center India 678 includes two displayed alerts that need remedial attention: Alert A 688 and Alert B 686. As before with the sunburst representation, super-group and group hierarchies are displayed. The polygon areas can be represented as proportional to the relative weights of their corresponding nodes. When used to render system monitoring data, each polygon can represent a particular component of the system under observation, nested inside of its parent component. The size, color, label and thumbnail image within each polygon transmit additional information about the state of the system under observation. The distance of each polygon from the center of the drawing can also be used to transmit additional information. In one example implementation, unhealthy components might be displayed closer to the center; with healthy components displayed near the margins.

Table visualizations can be configured to render hierarchical and dynamic system monitoring data with a table. This visualization presents hierarchical data in rows and columns. When used to render system monitoring data, each row represents a particular component of the system under observation and each column represents that component's health. A component with children can be expanded to display its children in additional nested rows. The size, color, label and thumbnail image for each component transmit additional information about the state of the system under observation. The order of rows can also be used to transmit additional information, e.g. move unhealthy components to the top; push healthy components to the bottom. As with the visualizations described for FIGS. 4-6, table visualizations are interactive: expandable and collapsible to focus on different levels of the hierarchy, and users can toggle between a hierarchy-based row order and a health-based row order, and can click or hover over a row to display additional details.

Tree visualizations can also be configured to render hierarchical and dynamic system monitoring data, presenting hierarchical data as a set of nested expandable and collapsible nodes. When used to render system monitoring data, each node represents a particular component of the system under observation. A node with children can be expanded to display its children in additional nested nodes. The color, label and thumbnail image for each node transmit additional information about the state of the system under observation. The order of nodes can also be used to transmit additional information; e.g. move unhealthy components to the top, and push healthy components to the bottom.

Cloud visualization 700, shown in FIG. 7, is configured to present hierarchical data as a set of boxes placed inside and/or around a central image. The same global data centers displayed in the sunburst of FIG. 4 are also shown in cloud 755. Aggregate operational statuses are arranged with Echo.E1.E1g Alert A 724, IndiaI1.I1c Alert A 768 and India.I1.I1c Alert B 769 displayed outside the cloud for ease of viewing.

When used to display a hierarchical representation of the aggregate operational status of the super-groups and groups and of the operational status of the computing devices based on received sample data values labeled by sampled computing devices and sampled aspect of operations, system monitoring data, each box represents an observation aspect that requires close monitoring or immediate remedial attention. The color, label and thumbnail images in the display can be used transmit additional information about the state of the system under observation. The placement of the box inside or outside the central image can also be used to transmit additional information, e.g. move unhealthy components outside the cloud, and push healthy components inside the cloud. The distance of a box from the center can also be used to transmit additional information, e.g. boxes representing nodes with higher severity problems may be displayed furthest out at the edge of the layout.

The hierarchical ecosystem for monitoring related objects and visualizations for those objects can be customized to optimize the effectiveness of the data for users of the disclosed disparate monitoring system. Subjects, aspects, lenses and perspectives can be configured using a graphical user interface. Example screens for configuring the system are described next.

FIG. 8 illustrates one user interface for configuring subjects 800 in a disparate monitoring system. In particular, the user interface of FIG. 8 allows a user to list the subject computing devices, view and edit details for the subject, and add a child. The search feature 822 accepts and matches on any element of a subject's absolute path, description, link names, link URLs, help email, help URL and tags. Delete is only an option for subject computing devices that have no children. Subject computing devices representing global data centers Bravo 842 and Echo 872 are shown in the subjects list, and the Delete feature 846 is available. For users with admin permissions new subjects can be added by entering the subject name, selecting the parent, entering a description of the subject, and entering the help email address and help URL, before saving the newly created subject. Each combination of subject name and parent must be unique. Changes, including adding a link, can be made by selecting edit 876.

The disclosed technology includes a user interface for creating, configuring, and listing, viewing and deleting an aspect—a global feature for customized monitoring of a sampled computing device. Examples of aspects for a particular sample of an operational aspect include average page time (APT), web login, API login, and app version. Additional example aspects include login, ping, temperature, average response time, and average response time deviation, described supra.

The particular sample of the operational aspect can be classified into a category selected from five or fewer categories that apply to the particular operational aspect.

FIG. 9 shows an example new aspect 9000 for average page time avgpagetime 922—with a value type of integer 953. The status assignments field is set to 'specify ranges of values', with values labeled 'n/a', 'ok', 'warning' or 'critical' for specified ranges of values 963. The slider scales to space values appropriately and labels on the status assignments slider are movable. For a different aspect, the status assignments field can be configured to 'specify discrete values' and the values can be configured to match selected labels. An aspect can also be configured as a Boolean value type with values mapped to configured status assignments. Value types and status formulas are configurable for each aspect. Example status levels that can be used include 'n/a', 'ok', 'warning' or 'critical', for received values. The status levels are usable by the lens builder to render data in the selected visualization.

The disclosed disparate monitoring for IoT graphical user interface for configuring subject devices to be monitored also includes features for listing users, adding new users, and editing user contact information, including email, and setting profile permissions. Additionally a thumbnail image can be associated with a user. User profiles can be listed, added and edited also. In one example implementation, an admin user profile with be set to have read and write permissions for aspects, lenses, profiles, samples, subjects and users, while a viewer profile will be configured to have read access only for aspects, lenses, profiles, samples, subjects and users. Both admins and viewers can be configured to have read and write access for perspectives, in this example. From the profiles list, a profile title (in this case admin or viewer) can be selected for viewing. The profile view includes the list of users who are configured as admin or viewer, in one implementation of the UI. A profile can only be deleted if no users are associated with it.

The above user interface implementations are only exemplary and can be similarly applied in another programming language, be it high-level programming language, low-level programming language, functional programming language, markup programming language or imperative programming language.

FIG. 10 shows one implementation of a flowchart 1000 of updating a data cube of samples and a display on a client device with a processor. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this workflow is described with reference to the system that carries out a method. The system is not necessarily part of the method.

At action 1010, the method includes receiving a GUI client at a client device with a processor.

At action 1020, the method includes receiving at the GUI client, initial reports of sample values that are labeled by sampled computing device and sampled aspect of operations, wherein the computing devices are each identified by at least a group membership, a super-group membership and a hierarchical relationship of the super-groups to the groups, and of the groups to the computing devices.

At action 1030, the method includes receiving, from the various devices being monitored and any relay devices, via the server, numerous subject computing devices samples that update reports of sampled aspects of operations, as described supra.

At action 1040, the method includes running the GUI client, which includes the actions described below.

At action 1050, the GUI client calculates group and super-group aggregate operational status by rolling up selected samples from the computing devices into their respective groups and super-groups, as described supra.

At action 1060, the GUI client causes display of a hierarchical representation of the aggregate operational status of the super-groups and groups and of the operational status of the computing devices, arranged to show the hierarchical relationship of the super-groups to the groups, and of the groups to the computing devices, as described supra.

At action 1070, the GUI client re-calculates group and super-group aggregate operational status and updates the visual representation of the aggregate operational status at the appropriate levels of the hierarchy, in real time as the samples reach the GUI client, as described supra.

At action 1080, an operator viewing a display of the hierarchical will be notified of operational aspects that require close monitoring or immediate remedial attention.

FIG. 11 shows one implementation of a flowchart 1100 of updating a data cube of samples and causing status displays on operator computer devices from the samples. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this workflow is described with reference to the system that carries out a method. The system is not necessarily part of the method.

At action 1110, the method includes providing a plurality of client devices with processors, with copies of a GUI client. Client devices can include mobile devices.

At action 1120, the method includes sending initial reports of sample values that are labeled by sampled computing device and sampled aspect of operations to the GUI clients, wherein the sampled devices are each identified by at least a group membership and a super-group membership.

At action 1130, the method includes receiving, from numerous subject computing devices, samples that update the reports of sampled aspects of operations.

At action 1140, the method includes pushing the updated reports to the GUI clients that are running.

At action 1150, the method includes the GUI client, adapted to execute the actions described below.

At action 1160, the GUI client calculates group and super-group aggregate operational status by rolling up selected samples from the computing devices into their respective groups and super-groups.

At action 1170, the GUI client causes display of a hierarchical representation of the aggregate operational status of the super-groups and groups and of the operational status of the computing devices, arranged to show the hierarchical relationship of the super-groups to the groups, and of the groups to the computing devices.

At action 1180, the GUI client updates the calculated group and super-group aggregate operational status and updating the hierarchical representation of the aggregate operational status of the super-groups and groups and of the operational status of computing devices, in real time as the samples reach the GUI client.

At action 1190, an operator viewing a display of the hierarchical representation will be notified of operational aspects that require close monitoring or immediate remedial attention.

Multi-Tenant Integration

Figure 12:
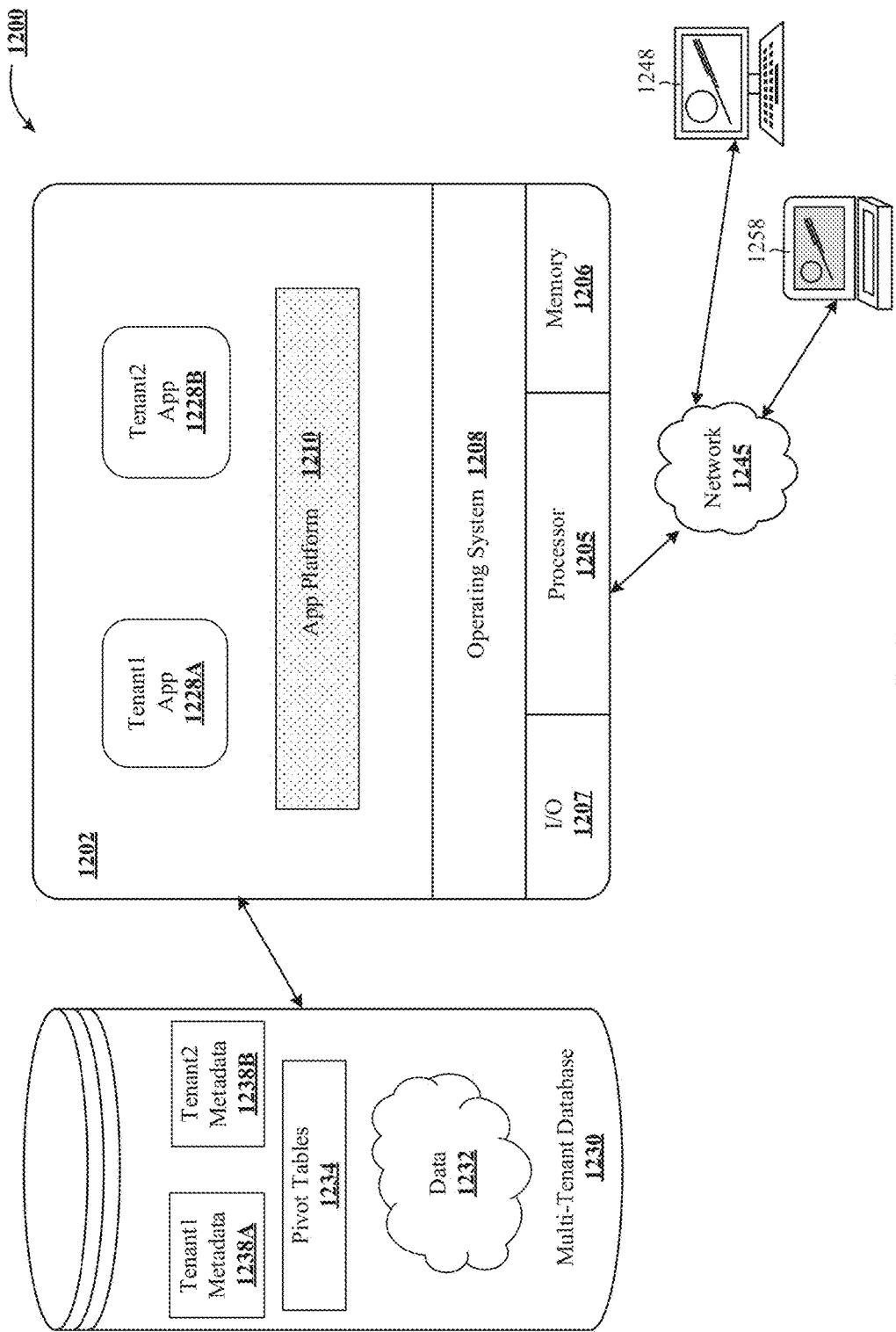
FIG. 12 is a block diagram of an exemplary multi-tenant system suitable for integration with the IoT platform of FIG. 1 in accordance with one or more implementations of the technology disclosed.

FIG. 12 presents a block diagram of an exemplary multi-tenant system 1200 suitable for integration with the IoT monitoring platform 100 of FIG. 1. In general, the illustrated multi-tenant system 1200 of FIG. 12 includes a server 1202 that dynamically creates and supports virtual applications 1228A and 1228B, based upon data 1232 from a common database 1230 that is shared between multiple tenants, alternatively referred to herein as a "multi-tenant database". Data and services generated by the virtual applications 1228A and 1228B, including GUI clients, are provided via a network 1245 to any number of client devices 1248 or 1258, as desired.

As used herein, a "tenant" or an "organization" refers to a group of one or more users that shares access to common subset of the data within the multi-tenant database 1230. In this regard, each tenant includes one or more users associated with, assigned to, or otherwise belonging to that respective tenant. Stated another way, each respective user within the multi-tenant system 1200 is associated with, assigned to, or otherwise belongs to a particular tenant of the plurality of tenants supported by the multi-tenant system 1200. Tenants may represent users, user departments, work or legal organizations, and/or any other entities that maintain data for particular sets of users within the multi-tenant system 1200. Although multiple tenants may share access to the server 1202 and the database 1230, the particular data and services provided from the server 1202 to each tenant can be securely isolated from those provided to other tenants. The multi-tenant architecture therefore allows different sets of users to share functionality and hardware resources without necessarily sharing any of the data 1232 belonging to or otherwise associated with other tenants.

The multi-tenant database 1230 is any sort of repository or other data storage system capable of storing and managing the data 1232 associated with any number of tenants. The database 1230 may be implemented using any type of conventional database server hardware. In various implementations, the database 1230 shares processing hardware with the server 1202. In other implementations, the database 1230 is implemented using separate physical and/or virtual database server hardware that communicates with the server 1202 to perform the various functions described herein. The multi-tenant database 1230 may alternatively be referred to herein as an on-demand database, in that the multi-tenant database 1230 provides (or is available to provide) data at run-time to on-demand virtual applications 1228A or 1228B generated by the application platform 1210, with tenant1 metadata 1238A and tenant2 metadata 1238B securely isolated.

In practice, the data 1232 may be organized and formatted in any manner to support the application platform 1210. In various implementations, conventional data relationships are established using any number of pivot tables 1234 that establish indexing, uniqueness, relationships between entities, and/or other aspects of conventional database organization as desired.

The server 1202 is implemented using one or more actual and/or virtual computing systems that collectively provide the dynamic application platform 1210 for generating the virtual applications. For example, the server 1202 may be implemented using a cluster of actual and/or virtual servers operating in conjunction with each other, typically in association with conventional network communications, cluster management, load balancing and other features as appropriate. The server 1202 operates with any sort of conventional processing hardware such as a processor 1205, memory 1206, input/output features 1207 and the like. The input/output features 1207 generally represent the interface(s) to networks (e.g., to the network 1245, or any other local area, wide area or other network), mass storage, display devices, data entry devices and/or the like. The processor 1205 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1206 represents any non-transitory short or long term storage or other computer-readable media capable of storing programming instructions for execution on the processor 1205, including any sort of random access memory (RAM), read only memory (ROM), flash memory, magnetic or optical mass storage, and/or the like. The computer-executable programming instructions, when read and executed by the server 1202 and/or processor 1205, cause the server 1202 and/or processor 1205 to create, generate, or otherwise facilitate the application platform 1210 and/or virtual applications 1228A and 1228B, and perform one or more additional tasks, operations, functions, and/or processes described herein. It should be noted that the memory 1206 represents one suitable implementation of such computer-readable media, and alternatively or additionally, the server 1202 could receive and cooperate with external computer-readable media that is realized as a portable or mobile component or application platform, e.g., a portable hard drive, a USB flash drive, an optical disc, or the like.

The application platform 1210 is any sort of software application or other data processing engine that generates the virtual applications 1228A and 1228B that provide data and/or services to the client devices 1248 and 1258. In a typical implementation, the application platform 1210 gains access to processing resources, communications interfaces and other features of the processing hardware using any sort of conventional or proprietary operating system 1208. The virtual applications 1228A and 1228B are typically generated at run-time in response to input received from the client devices 1248 and 1258.

With continued reference to FIG. 12, the data and services provided by the server 1202 can be retrieved using any sort of personal computer, mobile telephone, tablet or other network-enabled client device 1248 or 1258 on the network 1245. In an exemplary implementation, the client device 1248 or 1258 includes a display device, such as a monitor, screen, or another conventional electronic display capable of graphically presenting data and/or information retrieved from the multi-tenant database 1230.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Some Particular Implementations

Some particular implementations and features are described in the following discussion.

The technology disclosed, in one implementation, describes a method of updating a data cube of samples and a display on a client device with a processor, including receiving a GUI client at a client device with a processor; receiving at the GUI client, initial reports of sample values that are labeled by sampled computing device and sampled aspect of operations, wherein the computing devices are each identified by at least a group membership and a super-group membership and a hierarchical relationship of the super-groups to the groups, and of the groups to the computing devices; and receiving, from a relay device, numerous samples from computing devices that update the reports of sampled aspects of operations. The method also includes running the GUI client, including calculating group and super-group aggregate operational status by rolling up selected samples from the computing devices into their respective groups and super-groups; causing display of a hierarchical representation of the aggregate operational status of the super-groups and groups and of the operational status of the computing devices, arranged to show the hierarchical relationship; and updating the calculated group and super-group aggregate operational status and updating the hierarchical representation of the aggregate operational status of the super-groups and groups and of the operational status of computing devices, in real time as the samples reach the GUI client. Additionally, an operator viewing a display of the hierarchical representation will be notified of operational aspects that require close monitoring or immediate remedial attention. A client device with a processor can be implemented on a mobile device.

In some implementations, the method includes at least some of the computing devices identified by a subgroup membership that is hierarchically related to a group and, in turn, a super-group; and running the GUI client includes rolling up subgroups into groups, causing display of the hierarchical representation including the subgroups, and updating the aggregate status and updating the hierarchical representation in real time as the samples reach the GUI client.

For other implementations, the method includes computing devices identified by a membership in three or more levels of hierarchy, including additional hierarchy levels beyond the group and super-group; and running the GUI client includes rolling up the additional hierarchy levels, causing display of the hierarchical representation including the additional hierarchical levels, and updating the aggregate status and updating the hierarchical representation in real time as the samples reach the GUI client.

The method described in this section can include one or more of the following features and/or features described in connection with additional methods disclosed. In the interest of conciseness, the combinations of features disclosed in this application are not individually enumerated and are not repeated with each base set of features.

In some implementations, the disclosed method further includes sending a signal from the GUI client to the relay device indicating that the GUI client is running.

In one implementation, the disclosed method includes at least one sampled device that can be a device from a group consisting of servers, application servers, databases, file systems and search services. The method further includes the operational aspect sampling average page time, and includes one or more tuples; and classifying the average page time sample into a category selected from five or fewer categories. The method can include: receiving a particular sample of an operational aspect from a group consisting of at least one aspect from a group consisting of login, ping, temperature, CPU utilization, average response time, and average response time deviation; and classifying the particular sample of the operational aspect into a category selected from five or fewer categories that apply to the particular operational aspect. The disclosed method can further include categorizing the operational aspect samples by at least good and bad status categories and rolling up the categorized operational aspect samples by the most bad status category being rolled up. In one example, the most bad status category can be represented by a status of 'critical'.

The disclosed method includes the display of the hierarchical representation as at least one from a group of visualizations consisting of a sunburst, a treemap, a Voronoi treemap, and a cloud.

The method further includes receiving, in the numerous samples from computing devices, identification of the super-group and the group membership of the computing device. In some implementations, the identification received is a unique device ID that correlates with the super-group and the group membership of the computing device. In some implementations, the samples are received from fully qualified computing devices.

In another implementation, the technology disclosed includes a method of updating a data cube of samples and causing status displays on operator computer devices from the samples, including providing a plurality of operator computer devices with copies of a GUI client; sending initial reports of sample values that are labeled by sampled computing device and sampled aspect of operations to the GUI clients, wherein the sampled devices are each identified by at least a group membership and a super-group membership and a hierarchical relationship of the super-groups to the groups, and of the groups to the computing devices; receiving, from numerous subject computing devices, samples that update the reports of sampled aspects of operations; and pushing the updated reports to the GUI clients that are running. For the disclosed method, the GUI client is adapted to calculate group and super-group aggregate operational status by rolling up selected samples from the computing devices into their respective groups and super-groups; cause display of the hierarchical representation of the aggregate operational status of the super-groups and groups and of the operational status of the computing devices, arranged to show the hierarchical relationship, and update the calculated group and super-group aggregate operational status and update the hierarchical representation of the aggregate operational status of the super-groups and groups and of the operational status of the computing devices, in real time as the samples reach the GUI client. An operator viewing the GUI client will be notified of operational aspects that require close monitoring or immediate remedial attention. In some implementations, the disclosed method further includes receiving signals from at least some of the operator computer devices indicating that the GUI client is running.

Yet another implementation may include one or more tangible computer readable media impressed with instructions that, when executed on a computer device and one or more servers, carry out a method of updating a data cube of samples and causing status displays on operator computer devices from the samples, including a GUI client, adapted to calculate group and super-group aggregate operational status by rolling up selected samples from the subject computing devices into their respective groups and super-groups and hierarchical relationships; cause display of a hierarchical representation of the aggregate operational status of the super-groups and groups and of the operational status of computing device, arranged to show the hierarchical relationship of the super-groups to the groups, and of the groups to the computing devices; and update the calculated group and super-group aggregate operational status and update the hierarchical representation of the aggregate operational status of the super-groups and groups and of the operational status of the computing devices, in real time as the samples reach the GUI client. The disclosed implementation also includes a sample reporting server adapted to send initial reports of sample values that are labeled by sampled device and sampled aspect of operations, wherein the sample device is identified by at least a group membership and a super-group membership, to running GUI clients; receive from numerous subject computing devices samples that update the reports of sampled aspects of operations, and push the updated reports to copies of the running GUI clients; whereby the computer device and servers cooperate when executing so that an operator viewing the GUI client will be notified of operational aspects that require close monitoring or immediate remedial attention. The tangible computer readable media does not include transitory signals.

Other implementations of the method described in this section can include a computing system including at least one server comprising one or more processors and memory, coupled to the processors, containing computer instructions that, when executed on the processors, cause the computing system to perform any of the methods described above.

The terms and expressions employed herein are used as terms and expressions of description and not of limitation, and there is no intention, in the use of such terms and expressions, of excluding any equivalents of the features shown and described or portions thereof.

While the technology disclosed is disclosed by reference to the preferred embodiments and examples detailed above, it is to be understood that these examples are intended in an illustrative rather than in a limiting sense. Accordingly, the described implementations are to be considered in all respects as only illustrative and not restrictive. In addition, having described certain implementations of the technology disclosed, it is contemplated that modifications and combinations will readily occur to those of ordinary skill in the art. Other implementations incorporating the concepts disclosed herein can be used without departing from the spirit of the innovation and scope of the following claims.

What is claimed is:

1. A method comprising:
   receiving, by at least one processor running a GUI client, initial reports of sample values that are labeled by a sampled computing device of a plurality of computing devices and a sampled aspect of operations, wherein each computing device of the plurality of computing devices is identified by at least a group membership, a super-group membership, or a hierarchical relationship of a super-group to a group and of the group to the sampled computing device;
   receiving, by the at least one processor, from a relay device, updated samples, from the plurality of computing devices, that update the reports of the sampled aspect of operations;
   calculating, by the at least one processor, an aggregate operational status value for at least one of the group and the super-group, wherein the aggregate operational status value comprises a combined value corresponding to the group or to the super-group;
   generating, by the at least one processor, a notification based on the aggregate operational status value, wherein the at least one notification is a result of a comparison between the aggregate operational status value and at least one threshold value;
   causing, by the at least one processor, display of a hierarchical representation of the aggregate operational status values of the super-group and the group and the notification, wherein the notification corresponds to at least one of the super-group or group displayed and arranged to show the hierarchical relationship; and
   updating, by the at least one processor, the calculated group and super-group aggregate operational status value, the at least one notification, and the corresponding hierarchical representation of the super-group and group and of an operational status of the sampled computing device, in response to at least one of:
      a change in the hierarchical relationship of the super-group to the group,
      a change in the hierarchical relationship of the group to the plurality of computing devices, or
      a change in the combined value with respect to the at least one threshold, based on the updated samples.

2. The method of claim 1, further comprising:
   identifying, by the at least one processor, at least one computing device of the plurality of computing devices by a subgroup membership that is hierarchically related to the group and the super-group; and
   running, by the at least one processor, the GUI client.

3. The method of claim 1, further comprising:
   identifying, by the at least one processor, at least one computing device of the plurality of computing devices by a membership in three or more levels of hierarchy, including at least one additional hierarchy level in addition to the group and the super-group; and
   running, by the at least one processor, the GUI client.

4. The method of claim 1, further comprising:
sending, by the at least one processor, a signal from the GUI client to the relay device, indicating that the GUI client is running.

5. The method of claim 1, wherein the sampled computing device comprises at least one class of device selected from a group consisting of: application servers, database servers, file servers, and search servers.

6. The method of claim 1, wherein the aggregate operational status value reflects at least an operational aspect sampling average page time and further comprises one or more tuples; and wherein the calculating the aggregate operational status value further comprises classifying, by the at least one processor, the average page time sample into a category.

7. The method of claim 1, further comprising:
receiving, by the at least one processor, a sample of an operational aspect selected from a group consisting of login, ping, temperature, CPU utilization, average response time, and average response time deviation; and
classifying, by the at least one processor, the sample of the operational aspect into a category selected from five or fewer categories that apply to the operational aspect.

8. The method of claim 1, wherein the display of the hierarchical representation includes at least one visualization selected from a group of visualizations consisting of sunburst, treemap, Voronoi treemap, and cloud.

9. The method of claim 1, further comprising receiving, by the at least one processor, in the updated samples from computing devices, identification of the super-group membership and the group membership of the computing device.

10. The method of claim 1, further comprising receiving by the at least one processor, in the updated samples from computing devices a unique device ID that correlates with the super-group membership and the group membership of the computing device.

11. The method of claim 1, further comprising categorizing, by the at least one processor, the operational aspect samples by at least good and bad status categories.

12. A computing system including at least one server comprising one or more processors and memory, coupled to the one or more processors, containing computer instructions that, when executed on the processors, cause the computing system to carry out the method of claim 1.

13. A method comprising:
receiving, by at least one processor, from a sampled computing device of a plurality of sampled computing devices, an initial report of sample values that are labeled by the sampled computing device and a sampled aspect of operations, to a GUI client running on a client device, wherein the plurality of sampled computing devices are each identified by at least a group membership, a super-group membership, or a hierarchical relationship of a super-group to a group and of the group to the sampled computing device;
receiving, by at least one processor, from the sampled computing device, at least one updated sample that updates the initial report of the sampled aspect of operations or any subsequent update;
pushing the at least one updated report to the GUI client, wherein the GUI client is adapted to:
calculate, by the at least one processor, an aggregate operational status value for at least one of the group and the super-group, wherein the aggregate operational status value comprises a combined value corresponding to the group or to the super-group;
cause, by the at least one processor, display of a hierarchical representation of the aggregate operational status value of the super-group and group; and
update, by the at least one processor, the calculated group and super-group aggregate operational status value and the corresponding hierarchical representation of the super-group and group and of an operational status of the sampled computing device, in response to at least one of:
a change in the hierarchical relationship of the super-group to the group,
a change in the hierarchical relationship of the group to the plurality of sampled computing devices, or
a change in the combined value with respect to the at least one threshold, based on the at least one updated sample.

14. The method of claim 13, further comprising receiving, by the at least one processor, a signal from the GUI client indicating that the GUI client is running.

15. The method of claim 13, wherein the aggregate operational status value reflects at least an operational aspect sampling average page time and further comprises one or more tuples; and wherein to calculate the aggregate operational status value, the GUI client is further adapted to classify the average page time sample into a category.

16. The method of claim 13, further comprising: receiving, by the at least one processor, a sample of an operational aspect from a group consisting of login, ping, temperature, CPU utilization, average response time, and average response time deviation; and classifying, by the at least one processor, the sample of the operational aspect into a category selected from five or fewer categories that apply to the operational aspect.

17. The method of claim 13, further comprising categorizing, by the at least one processor, the operational aspect samples by at least good and bad status categories.

18. The method of claim 13, wherein the display of the hierarchical representation includes at least one visualization selected from a group of visualizations consisting of sunburst, treemap, Voronoi treemap, and cloud.

19. The method of claim 13, further comprising receiving, by the at least one processor, in the updated samples from the plurality of computing devices, identification of the super-group membership and the group membership of the computing device.

20. The method of claim 13, further comprising receiving, by the at least one processor, in the updated samples from computing devices, a unique device ID that correlates with the super-group membership and the group membership of the computing device.

21. A computing system comprising at least one server comprising one or more processors and memory, coupled to the one or more processors, containing computer instructions that, when executed on the processors, cause the computing system to carry out the method of claim 13.

22. A non-transitory computer-readable storage medium comprising instructions that, when executed on at least one processor, cause the at least one processor to perform operations comprising:
displaying a GUI client adapted to:
calculate an aggregate operational status value for at least one of a group and a super-group, wherein the aggregate operational status value comprises a combined value corresponding to the group or to the super-group;

cause display of a hierarchical representation of the aggregate operational status value of the super-group and the group in a hierarchical relationship corresponding to a sampled computing device, and of an operational status of the sampled computing device;

update the calculated group and super-group aggregate operational status values and the corresponding hierarchical representation of the aggregate operational status values of the super-group and group of the sampled computing device;

send, to a running GUI client, a report of sample values that are labeled by the sampled computing device and a sampled aspect of operations, wherein the sampled computing device is identified by at least a group membership, a super-group membership, or a hierarchical relationship of the super-group to the group and of the group to the sampled computing device;

receive from the sampled computing device, an updated sample that updates the report of the sampled aspect of operations; and push the updated reports to the running GUI client or to at least one copy of the running GUI client, in response to at least one of:

a change in the hierarchical relationship of the super-group to the group, a change in the hierarchical relationship of the group to the sampled computing device, or a change in the combined value with respect to the at least one threshold, based on the updated sample.

23. The non-transitory computer-readable storage medium of claim 22, wherein the sampled computing device comprises at least one class of device selected from a group consisting of: application servers, database servers, file servers, and search servers.

24. The non-transitory computer-readable storage medium of claim 22, wherein the aggregate operational status value reflects at least an operational aspect sampling average page time and further comprises one or more tuples; and wherein to calculate the aggregate operational status value, the GUI client is further adapted to classify the average page time sample into a category.

25. The non-transitory computer-readable storage medium of claim 22, wherein the display of the hierarchical representation includes at least one visualization selected from a group of visualizations consisting of: sunburst, treemap, Voronoi treemap, and cloud.

* * * * *